United States Patent
Sano et al.

(10) Patent No.: US 11,428,402 B2
(45) Date of Patent: Aug. 30, 2022

(54) CEMENT KILN BURNER DEVICE AND METHOD FOR OPERATING THE SAME

(71) Applicant: Taiheiyo Cement Corporation, Tokyo (JP)

(72) Inventors: Yuya Sano, Sakura (JP); Kana Horiba, Sakura (JP); Hideyuki Sugaya, Sakura (JP)

(73) Assignee: Taiheiyo Cement Corporation, Tokyo (JP)

(*) Notice: Subject to any disclaimer, the term of this patent is extended or adjusted under 35 U.S.C. 154(b) by 0 days.

(21) Appl. No.: 16/643,172

(22) PCT Filed: Mar. 19, 2019

(86) PCT No.: PCT/JP2019/011571
§ 371 (c)(1),
(2) Date: Feb. 28, 2020

(87) PCT Pub. No.: WO2020/188772
PCT Pub. Date: Sep. 24, 2020

(65) Prior Publication Data
US 2021/0404649 A1 Dec. 30, 2021

(51) Int. Cl.
*F23C 1/06* (2006.01)
*C04B 7/44* (2006.01)
(Continued)

(52) U.S. Cl.
CPC .............. *F23C 1/06* (2013.01); *C04B 7/4492* (2013.01); *C04B 7/45* (2013.01); *F23C 7/002* (2013.01);
(Continued)

(58) Field of Classification Search
CPC .......... F23C 1/06; F23C 7/002; C04B 7/4492; C04B 7/45; F23D 23/00; F23D 2201/00;
(Continued)

(56) References Cited

U.S. PATENT DOCUMENTS 5,979,342 A * 11/1999 Leisse ................ F23D 1/02
110/264
2010/0162930 A1 7/2010 Okazaki et al.

FOREIGN PATENT DOCUMENTS

CN 102434878 A 5/2012
JP H10-160131 A 6/1998
(Continued)

OTHER PUBLICATIONS

Japanese Office Action for Application No. 2019-534770, dated Apr. 3, 2020 in 12 pages. (English Translation included).
Chinese Office Action issued for Chinese Patent Application No. 201980003650.2, dated Mar. 24, 2021 in 20 pages including English translation.
(Continued)

*Primary Examiner* — Vivek K Shirsat
(74) *Attorney, Agent, or Firm* — Knobbe, Martens, Olson & Bear, LLP

(57) ABSTRACT

A cement kiln burner device includes a powdered-solid-fuel flow channel, a first air flow channel placed inside the powdered-solid-fuel flow channel to be adjacent to the powdered-solid-fuel flow channel, having means for swirling an air flow, an outer air flow-channel group placed concentrically in an outermost side outside the powdered-solid-fuel flow channel, having three or more second air flow channels adapted to form means for straightly forwarding an air flow, and a combustible-solid-waste flow channel placed inside the first air flow channel. The second air flow channels are placed proximally to each other in a radial direction within a range where air flows ejected from the respective second air flow channels are merged to form a single air flow, and are configured to control flow rates of the air flow ejected from the respective second air flow channels, independently for each second air flow channel.

11 Claims, 12 Drawing Sheets

(51) Int. Cl.
*C04B 7/45* (2006.01)
*F23C 7/00* (2006.01)
*F23D 23/00* (2006.01)

(52) U.S. Cl.
CPC .... *F23D 23/00* (2013.01); *F23C 2900/03004* (2013.01); *F23D 2201/20* (2013.01); *F23D 2204/00* (2013.01); *F23D 2205/00* (2013.01); *F23D 2900/21* (2013.01)

(58) Field of Classification Search
CPC ........... F23D 2201/10; F23D 2201/101; F23D 1/005; F23D 1/02; F23D 1/04; F23D 1/06
USPC .................................. 432/105; 431/182–184
See application file for complete search history.

(56) References Cited

FOREIGN PATENT DOCUMENTS

| | | |
|---|---|---|
| JP | 2001012705 A | 1/2001 |
| JP | 2003-279003 A | 10/2003 |
| JP | 2009-079794 A | 4/2009 |
| JP | 2009-264654 A | 11/2009 |
| JP | 2010-139180 A | 6/2010 |
| JP | 2013-237571 A | 11/2013 |
| JP | 2015-190731 A | 11/2015 |
| WO | 2009/034626 A1 | 3/2009 |
| WO | 2014/014065 A1 | 7/2016 |

OTHER PUBLICATIONS

International Search Report for PCT Application No. PCT/JP2019/011571, dated May 21, 2019 in 3 pages.

* cited by examiner

CEMENT KILN BURNER DEVICE AND METHOD FOR OPERATING THE SAME

CROSS-REFERENCE TO RELATED APPLICATIONS

This application is the U.S. National Phase under 35. U.S.C. § 371 of International Application PCT/JP2019/011571, filed Mar. 19, 2019. The disclosure of which including the specification, the drawings, and the claims is hereby incorporated by reference in its entirety.

TECHNICAL FIELD

The present invention relates to a cement kiln burner device, particularly to a cement kiln burner device capable of utilizing combustible solid wastes as supplemental fuels in calcinations for cement clinkers. Further, the present invention relates to a method for operating such a cement kiln burner device.

BACKGROUND ART

Combustible solid wastes, such as waste plastics, wood chips, automobile shredder residues (ASR), have heat quantities enough to use such combustible solid wastes as calcination fuels. Therefore, there has been promotion of effective utilization of combustible solid wastes as alternative fuels substituted for pulverized coals, which are main fuels, in rotary kilns for use in cement clinker calcinations. Hereinafter, such rotary kilns for use in cement clinker calcinations will be referred to as "cement kilns".

Conventionally, in view of fuel recycling, when combustible solid wastes are used as fuels in cement kilns, such combustible solid wastes have been used in calcining furnaces installed at kiln tail portions, which exert less influences on cement clinkers. However, such calcining furnaces have been nearly saturated with combustible solid wastes used therein in amount. Therefore, there have been requirements for techniques for using combustible solid wastes in main burners installed at kiln front portions.

However, use of combustible solid wastes as supplemental fuels in main burners of cement kilns may cause phenomena (which will be referred to as "landing combustion") in which combustible solid wastes ejected from main burners are continuously combusted even after having landed on cement clinkers in the cement kilns. If such landing combustion occurs, this induces reducing calcination of cement clinkers around the positions where the combustible solid wastes have landed, which induces whitening of cement clinkers, and abnormal clinkering reactions.

In order to prevent landing combustion of combustible solid wastes, there have been required (i) techniques for maintaining a combustible solid waste at a floating state in a cement kiln for a longer time period and, further, completing combustion of the combustible solid waste maintained at the floating state, and (ii) techniques for causing a combustible solid waste to land at farther positions (near the kiln tail) within a cement kiln and, further, completing combustion of the combustible solid waste before clinker raw materials reach a clinkering main reaction area.

For example, the following Patent Document 1 discloses a cement kiln provided with a main fuel burner for ejecting pulverized coal as a main fuel, and an auxiliary burner for injecting a combustible solid waste, as a technique for combusting a major part of a combustible solid waste in a floating state, in which the cement kiln is adapted such that primary air from the main fuel burner is supplied in such a way as to swirl in one direction when viewed in the axis direction from the kiln front side of the cement kiln main body and, further, the auxiliary burner is placed outside the main fuel burner, within the range from the top portion (0 degree) of the main fuel burner to 55 degrees in the opposite direction from the aforementioned one direction about the axis, with respect to a vertical straight line passing through the aforementioned axis.

PRIOR ART DOCUMENT

Patent Document

Patent Document 1: JP-A-2013-237571

SUMMARY OF THE INVENTION

Problems to be Solved by the Invention

However, the method in Patent Document 1 is insufficient in effect of maintaining combustible solid wastes at floating states, which restricts combustible solid wastes adaptable thereto to those with smaller bulk specific gravities, such as waste plastics. Further, this method in Patent Document 1 has the problem of difficulty in completely combusting even waste plastics having sizes with outer diameters more than 15 mm while maintaining them at floating states. Namely, the method in Patent Document 1 imposes a large restriction on combustible solid wastes usable therein, in terms of bulk specific gravity and size.

Further, the ratio between the amount of pulverized coal used as a main fuel in a cement kiln burner and the amount of combustible solid waste used therein as a supplemental fuel may be changed, depending on conditions of acquisition of these fuels, and the like. Therefore, cement kiln burners are required to have such operability as to be capable of creating optimum flame states, during running operations, depending on changes of the types and amounts of fuels used therein. However, regarding the method in Patent Document 1, there is disclosed only the placement of the main fuel burner used for combustion of pulverized coal, and the auxiliary burner used for combustion of combustible solid wastes, and there is no description about actual running methods therefor.

In view of the aforementioned problems, it is an object of the present invention to provide a cement kiln burner device capable of freely forming preferable combustion states, during running operations, depending on the quantity (or the presence or absence) of combustible solid wastes used as supplemental fuel. Further, it is another object of the present invention to provide a method for operating such a cement kiln burner device.

Means for Solving the Problems

As a result of earnest studies about the aforementioned problems, the present inventors have newly found that the aforementioned problems can be overcome, by configuring a cement kiln burner device (i) to be a multiple-channel type burner including four or more flow channels for primary air, in addition to a single flow channel for fuel flows (air flows containing pulverized coal), as injection ports in a main burner, (ii) to have a single bundle of flow channels constituted by at least three flow channels in an outermost side, and (iii) to independently control flow rates of air flows through each of the flow channels constituting the single bundle of flow channels.

Namely, a cement kiln burner device according to the present invention is a cement kiln burner device including a plurality of flow channels partitioned by a plurality of concentric cylindrical members, the cement kiln burner device including: a powdered-solid-fuel flow channel including means for swirling a powdered solid fuel flow; a first air flow channel (first swirl inner flows) placed inside the powdered-solid-fuel flow channel to be adjacent to the powdered-solid-fuel flow channel, the first air flow channel including means for swirling an air flow; an outer air flow-channel group (first straight outer flow group) placed concentrically in an outermost side outside the powdered-solid-fuel flow channel, the outer air flow-channel group including three or more second air flow channels (first straight outer flows) adapted to form means for straightly forwarding an air flow; and a combustible-solid-waste flow channel placed inside the first air flow channel, in which the three or more second air flow channels constituting the outer air flow-channel group are placed proximally to each other in a radial direction within a range where air flows ejected from the respective second air flow channels are merged to form a single air flow, and are configured to control flow rates of the air flows ejected from the respective second air flow channels, independently for each second air flow channel.

Further, the powdered-solid-fuel flow channel, the first air flow channel, the respective second air flow channels constituting the outer air flow-channel group, and the combustible-solid-waste flow channel are each extended up to the tip end surface of the cement burner device.

Namely, the cement kiln burner device having the aforementioned structure includes the outer air flow-channel group (first straight outer flow group) including the at least three second air flow channels (first straight outer flows) in an outer side, and the single first air flow channel (first swirl inner flows) in an inner side, such that the powdered-solid-fuel flow channel is sandwiched therebetween. Further, air flows ejected from the respective second air flow channels constituting the outer air flow-channel group and from the first air flow channels can be adjusted in flow rate (which will be also referred to as "amount of air", in some cases), independently of each other, during running operations.

Accordingly, with the cement kiln burner device according to the present invention, it is possible to form optimum flame suitable for the types of a powdered solid fuel (a main fuel) and a combustible solid waste (a supplemental fuel) which are used therein, and the ratio between the powdered solid fuel and the combustible solid waste which are used therein, by controlling the amounts of air ejected from the air flow channels during running operations. For example, in cases of using a larger amount of a combustible solid waste as a supplemental fuel, it is possible to intensively bring the combustible solid waste into a floating state within the cement kiln, thereby creating a combustion state which is more prone to induce ignition of the combustible solid waste being in the floating state, during running operations. Further, for example, when the ratio of a combustible solid waste used therein as a supplemental fuel is lower, it is possible to form a combustion state suitable for combustion of powdered solid fuels such as pulverized coal, during running operations.

As described above, the three or more second air flow channels constituting the outer air flow-channel group (the first straight outer flow group) are placed proximally to each other in the radial direction, within such a range that air flows ejected from the respective second air flow channels are merged to form a single air flow. In the present specification, the term "the first straight outer flow group" is used to mean that first straight outer flows ejected from the plural second air flow channels are grouped in a bundle shape.

In order to merge air flows (first straight outer flows) ejected from the respective second air flow channels, it is preferable that the radial interval "tb" between the second air flow channels is equal to or more than the radial width (thickness) "ta" of the second air flow channels, but is equal to or less than twice "ta". Further, when "the radial interval between the second air flow channels" has two or more different values, a smallest value out of them can be defined as the value of "tb". Similarly, when "the width (thickness) of each second air flow channel" has two or more different values, a smallest value out of them can be defined as the value of "ta". However, it is more preferable that "the radial width (thickness) of the second air flow channels" and "the radial interval between the second air flow channels" have substantially the same values at all positions.

Further, the three or more second air flow channels constituting the outer air flow-channel group are adapted such that air flows ejected from the respective second air flows can be controlled in flow rate (flow velocity), independently of each other, on a second-air-flow-channel by second-air-flow-channel basis.

Accordingly, by ejecting air flows from all the second air flow channels constituting the outer air flow-channel group, it is possible to form a single thick straight air flow (a first straight outer flow group), thereby elongating burner flame. This facilitates forming a burner-flame stabilized state, in cases of mainly using a powdered solid fuel (a main fuel).

Further, for example, by increasing the amounts of air ejected from the second air flow channels positioned in an inner side and in an outer side, out of the three or more second air flow channels constituting the outer air flow-channel group, it is possible to increase the degree and range of turbulence of air flows in burner flame. This enables rapidly introducing, into burner flame, a larger amount of secondary air, which is high-temperature air supplied into the cement kiln from a clinker cooler. This enables maintaining the combustible solid waste (the supplemental fuel) at a floating state for a longer time period, thereby combusting and burning out the combustible solid waste in such a floating state.

In the aforementioned structure, at least one second air flow channel, out of the second air flow channels constituting the outer air flow-channel group, may be divided in a circumferential direction into four or more opening portions adapted to form ports for injecting air flows, and be configured to control flow rates of the air flows ejected from the respective opening portions, independently for each opening portion.

If combustion by the burner is performed for a long time period, this may cause changes of the burner combustion state with time, such as changes of the burner flame shape. Further, depending on the types of the powdered solid fuel and the combustible solid waste which are used therein, there may be a need for adjusting combustion conditions while continuing the running state. With the aforementioned structure, it is possible to control the flow rates of air flows ejected from the respective opening portions constituting the air-flow injection ports in the second air flow channels, independently of each other. This enables easily adjusting air-flow supply conditions for providing optimum flame, depending on the burner flame shape and the fuel combustion state.

In the aforementioned structure, two or more second air flow channels, out of the second air flow channels constituting the outer air flow-channel group, may be configured to control the flow rates of the air flows ejected from the respective opening portions, which are four or more divisions in the circumferential direction, independently for each opening portion, and the respective opening portions included in the respective second air flow channels may be placed in concentric circular arc shapes at common deflection angles on polar coordinates with an origin point at an axis center, when being taken along a plane orthogonal to the axis center.

With the aforementioned structure, two or more second air flow channels, out of the three or more second air flow channels constituting the outer air flow-channel group, include the opening portions which are four or more divisions of the second air flow channels in the circumstantial direction. This enables easily forming turbulent flows with respect to air flows (a first straight outer flow group) ejected from the outer air flow-channel group, which behave as a single air flow. Further, this enables controlling the state of these turbulent flows.

Further, with the aforementioned structure, the respective opening portions included in the respective second air flow channels are placed in concentric circular-arc shapes, at common deflection angles on the polar coordinates having an origin point at the axis center, when being taken along a plane orthogonal to the axis center. In other words, the respective opening portions included in the different air flow channels positioned concentrically are placed at the same positions in the circumferential direction. As a result thereof, air flows from the outer air flow-channel group, which behave as a single air flow, can be divided into plural air flows distributed in the circumferential direction. Further, by individually adjusting the flow rates (the flow velocities) of air flows ejected from the respective opening portions included in the respective second air flow channels, it is possible to arbitrarily adjust the respective flow rates, the respective flow velocities and the respective flow thicknesses of these plural air flows distributed in the circumferential direction.

For example, by substantially nulling the flow rates of air flows ejected from adjacent opening portions, it is possible to create partial air flows ejected from the outer air flow-channel group, thereby substantially creating a bundle of several straight flows. Namely, with the cement kiln burner device having the aforementioned structure, it is possible to change air flows ejected from the outer air flow-channel group to various flows, while continuing running operations. This enables arbitrarily controlling the degree and range of turbulence of air flows ejected from the burner device. Accordingly, with the cement kiln burner device, during combustion using only a powdered solid fuel (a main fuel) (single-fuel combustion) or combustion using a powdered solid fuel (a main fuel) in combination with a combustible solid waste (a supplemental fuel) (mixed-fuel combustion), it is possible to arbitrarily control the state of burner flame, depending on the types of these fuels, and the amounts of these fuels used therein.

Further, with the cement kiln burner device having the aforementioned structure, it is also possible to easily modify the burner flame state during running operations, for coping with burner flame changes caused by wears, damages and the like of the burner device due to long-term continuous running.

Preferably, the combustible-solid-waste flow channel forms means for straightly forwarding an air flow containing a combustible solid waste.

With this structure, it is possible to sufficiently mix the aforementioned combustible solid waste flows with the primary air ejected from the powdered-solid-fuel flow channel, the first air flow channel and the at least three air flow channels constituting the outer air flow-channel group, and with the secondary air which is oxygen-rich high-temperature air at a temperature of about 1000 degrees C., in which the secondary air is supplied to the vicinity of the burner-installed portion in the cement kiln from a clinker cooler. This enables rapidly attaining a high-temperature environment, while supplying a sufficient amount of oxygen to peripheries of the combustible solid waste being in a floating state, thereby early completing the combustion of the combustible solid waste maintained at the floating state.

The aforementioned cement kiln burner device may further include a third air flow channel (first swirl outer flows) placed outside the powdered-solid-fuel flow channel and inside the outer air flow-channel group, in which the third air flow channel may include means for swirling an air flow.

With the aforementioned structure, it is possible to stabilize the ignition of the powdered solid fuel and the combustible solid waste and, further, it is possible to form internal circulations of reduction areas and air flows within burner flame, through the first swirl outer flows formed by air flows ejected from the third air flow channels. This can reduce NOx in the exhaust combustion gas.

Further, according to the present invention, there is provided a method for operating the aforementioned cement kiln burner device. The method includes ejecting an air flow from at least one second air flow channel, out of the second air flow channels constituting the outer air flow-channel group, in which air flows ejected from all the second air flow channels have a flow velocity of 400 m/s or less at a burner tip.

The operating method may also include operating the cement kiln burner device while changing a flow rate of an air flow ejected from at least one second air flow channel, out of the second air flow channels constituting the outer air flow-channel group.

Further, when the second air flow channels include the plural opening portions in the circumferential direction, the operating method may also include operating the cement kiln burner device while changing a flow rate of an air flow ejected from at least one of the opening portions.

In the aforementioned operating method, an air flow containing a powdered solid fuel which is ejected from the powdered-solid-fuel flow channel can have a swirl angle larger than 0 degree and equal to or less than 15 degrees at the burner tip. Further, an air flow ejected from the first air flow channel can have a swirl angle of 30 degrees to 50 degrees at the burner tip.

Further, in the aforementioned operating method, the air flow containing the powdered solid fuel which is ejected from the powdered-solid-fuel flow channel may have a flow velocity of 30 m/s to 80 m/s at the burner tip, the air flow ejected from the first air flow channel may have a flow velocity of 5 m/s to 240 m/s at the burner tip, and an air flow containing a combustible solid waste which is ejected from the combustible-solid-waste flow channel may have a flow velocity of 30 m/s to 80 m/s at the burner tip.

When the cement kiln burner device further includes a third air flow channel placed outside the powdered-solid-fuel flow channel and inside the outer air flow-channel group, and the third air flow channel includes means for swirling an air flow, an air flow ejected from the third air flow channel may have a swirl angle of 1 degree to 50 degrees at the burner tip, and further can have a flow velocity of 60 m/s to 240 m/s at the burner tip.

Further, in the aforementioned operating method, a combustible solid waste ejected from the combustible-solid-waste flow channel can have a particle size of 30 mm or less.

Further, in the aforementioned operating method, the rate of substitution of the combustible solid waste (the supplemental fuel) ejected from the combustible-solid-waste flow channel, with respect to the powdered solid fuel (the main fuel) ejected from the powdered-solid-fuel flow path can be 60 amount-of-heat % or less.

Effect of the Invention

With the cement kiln burner device and the method for operating the same, it is possible to arbitrarily form preferable combustion states, during running operations, depending on the quantity (or the presence or absence) of combustible solid wastes used as supplemental fuel and, furthermore, it is possible to effectively utilize combustible solid wastes with particle sizes of 30 mm or less as supplemental fuels.

MODE FOR CARRYING OUT THE INVENTION

Figure 1:
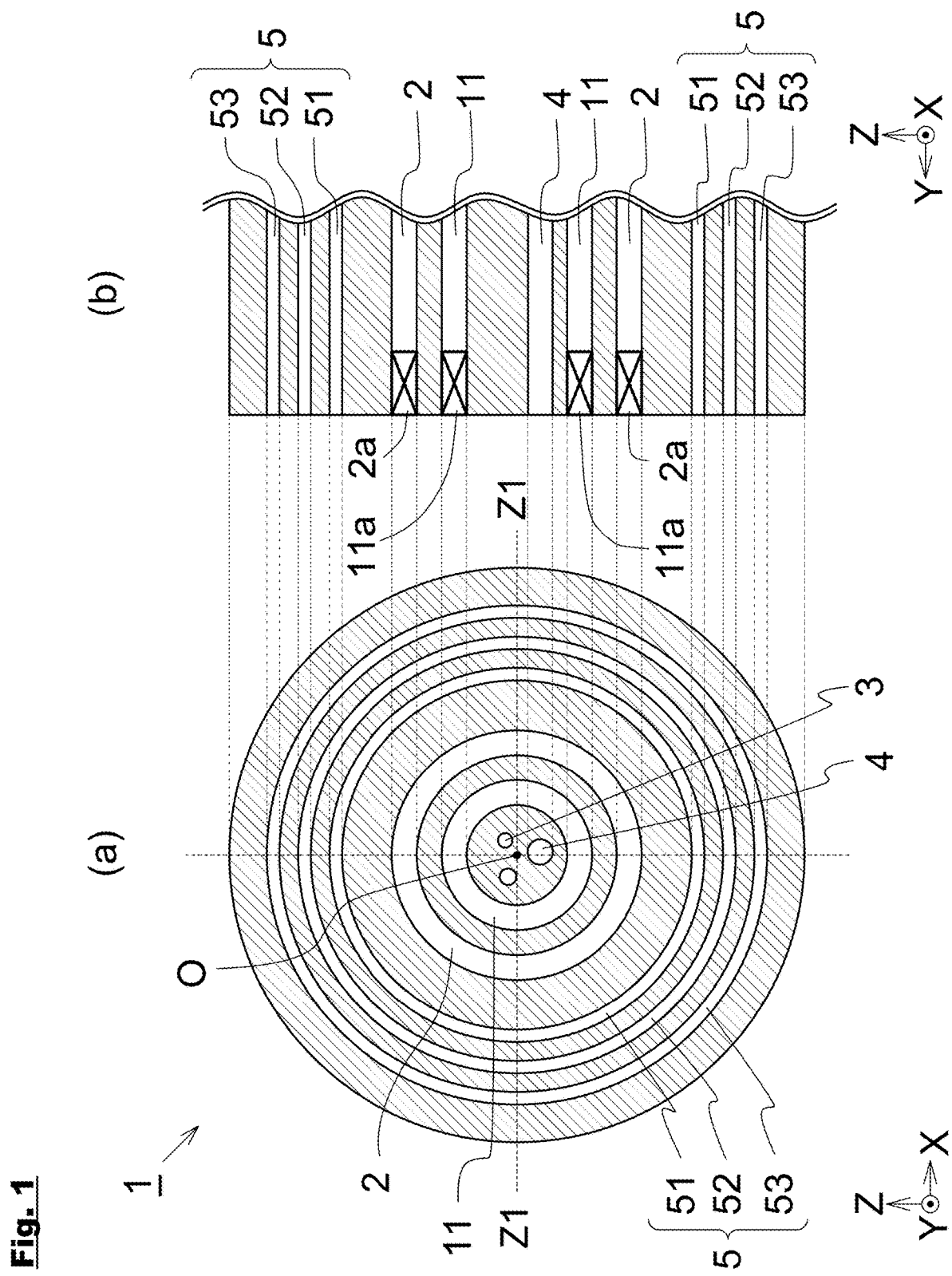
FIG. 1 is a view schematically illustrating a cement kiln burner device according to the present invention, in an embodiment, at its tip-end portion.

Hereinafter, there will be described embodiments of a cement kiln burner device and a method for operating the same, according to the present invention, with reference to the drawings. The drawings which will be described later are schematically illustrated, and dimension ratios in the drawings are not coincident with the actual dimension ratios.

FIG. 1 is a view schematically illustrating a cement kiln burner device according to an embodiment, at its tip-end portion. In FIG. 1. (a) is a lateral cross-sectional view of the cement kiln burner device, and (b) is a longitudinal cross-sectional view of the same. Further, the lateral cross-sectional view refers to a cross-sectional view of the cement kiln burner device taken along a plane orthogonal to the axial direction of the same device. The longitudinal cross-sectional view refers to a cross-sectional view of the cement kiln burner device taken along a plane parallel to the axial direction of the same device.

Further, in FIG. 1, there is defined a coordinate system, by defining the axial direction of the cement kiln burner device (namely, the direction of air flows) as a Y direction, by defining the vertical direction as a Z direction, and by defining the direction orthogonal to a YZ plane as an X direction. Hereinafter, descriptions will be given by making reference to this XYZ coordinate system. By using this XYZ coordinate system, FIG. 1(a) corresponds to a cross-sectional view of the cement kiln burner device, taken along an XZ plane, and FIG. 1(b) corresponds to a cross-sectional view of the cement kiln burner device, taken along a YZ plane. More specifically, FIG. 1(b) corresponds to a cross-sectional view of the cement kiln burner device, taken along a YZ plane, at a position near the burner tip.

In FIG. 1, hatching is given to portions where there are placed members, while no hatching is given to portions where there are formed flow channels for flowing fluids such as air and oil therethrough.

As illustrated in FIG. 1, the cement kiln burner device 1 includes two air flow channels (2, 11) and a single air flow-channel group 5 including at least three air flow channels (51, 52 and 53), which are concentrically placed. More specifically, the cement kiln burner device 1 includes a total of five air flow channels, which are a powdered-solid-fuel flow channel 2, a first air flow channel 11 placed inside the powdered-solid-fuel flow channel 2 adjacent thereto, and the outer air flow-channel group 5 constituted by three or more second air flow channels (51, 52 and 53) placed concentrically in an outermost side outside the powdered-solid-fuel flow channel 2. Namely, the cement kiln burner device 1 illustrated in FIG. 1 is a so-called five-channel type burner device. Further, there are placed an oil flow channel 3, a combustible-solid-waste flow channel 4 and the like, inside the first air flow channel 11.

The second air flow channels (51, 52 and 53) constituting the outer air flow-channel group 5 are placed proximally to each other, enough to merge three air flows ejected from the respective second air flow channels (51, 52 and 53) for forming a single larger air flow. This will be described later in detail. Incidentally, there will be described a case where the outer air flow-channel group 5 is constituted by the three second air flow channels (51, 52 and 53), the same applies to cases where it includes four or more second air flow channels (51, 52, 53, . . . ).

In the powdered-solid-fuel flow channel 2 and the first air flow channel 11, swirl vanes (2a and 11a) as swirl means are secured to the burner tip-end portions in the respective flow channels, respectively (see FIG. 1(b)). Namely, air flows ejected from the first air flow channel 11 form swirl air flows (which will be properly referred to as "first swirl inner flows", hereinafter) positioned inside powdered-solid-fuel flows ejected from the powdered-solid-fuel flow channel 2. Further, the respective swirl vanes (2a and 11a) are adjustable in swirl angle, at the time point before the start of operation of the cement kiln burner device 1.

On the other hand, no swirl means is provided in the three or more second air flow channels (51, 52, 53) constituting the outer air flow-channel group 5 positioned in the outermost side. Namely, air flows ejected from the second air flow channels (51, 52, 53) form straight air flows (which will be properly referred to as "first straight outer flows", hereinafter) positioned outside the powdered-solid-fuel flows ejected from the powdered-solid-fuel flow channel 2. Further, as described above, air flows ejected from the respective second air flow channels (51, 52, 53) are merged to form a single larger air flow (a first straight outer flow group). This will be described with reference to FIG. 2, which is a view illustrating a portion of FIG. 1, in an enlarging manner.

Figure 2:
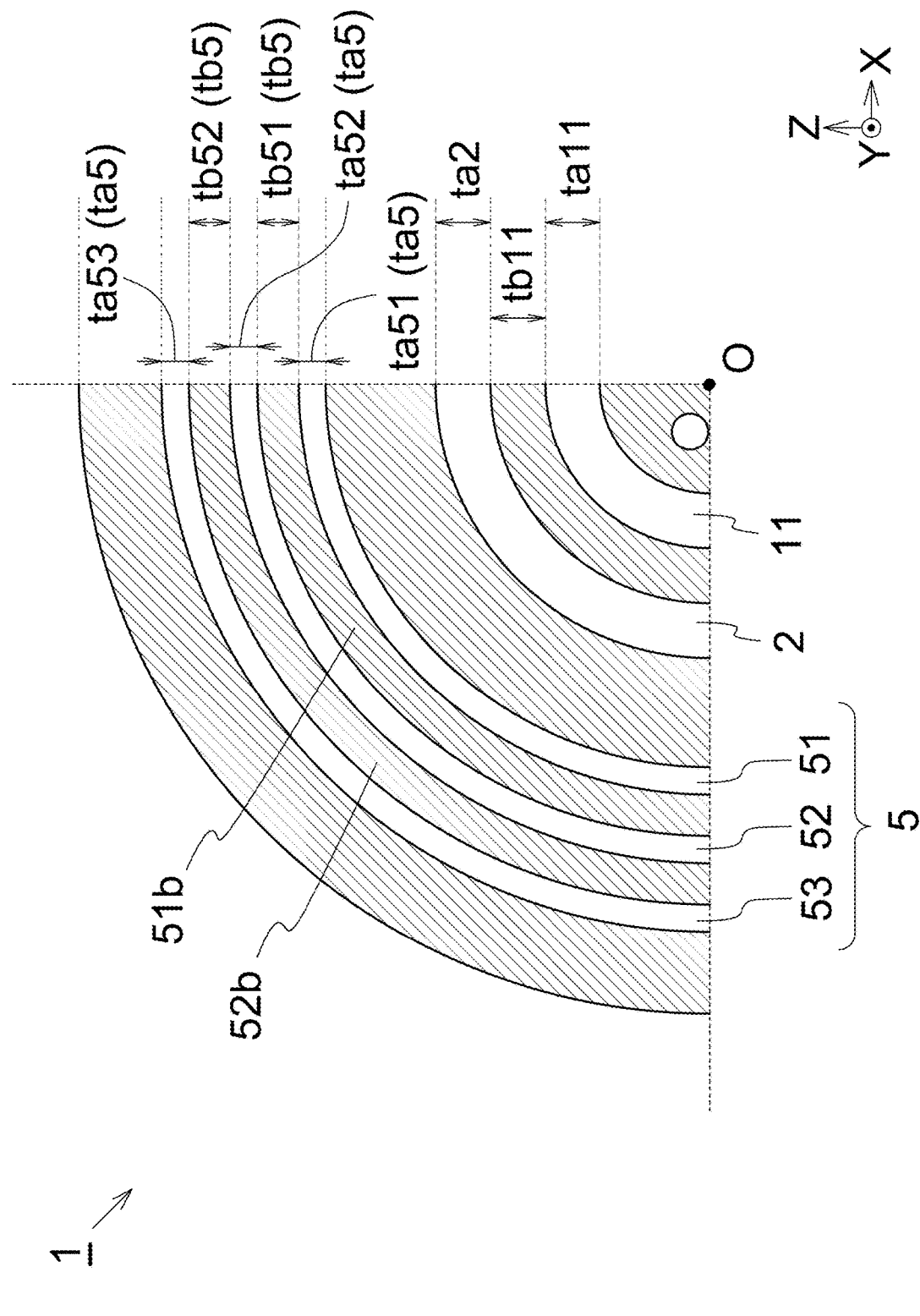
FIG. 2 is a view enlarging a portion of FIG. 1.

FIG. 2 is a view enlarging a portion positioned in the +Z side and in the +Y side with respect to the axis center O, which is extracted from FIG. 1(a).

In the present embodiment, the second air flow channels (51, 52, 53) constituting the outer air flow-channel group 5 are placed in such a way as to be partitioned by concentric cylindrical members. More specifically, as illustrated in FIG. 2, the second air flow channels (51, 52, 53) are partitioned from each other by partition portions (51b and 52b). In this case, in order to merge the three air flows ejected from the second air flow channels (51, 52, 53) constituting the outer air flow-channel group 5 to form a single air flow, as described above, it is preferable that the respective second air flow channels (51, 52, 53) are placed proximally to each other in the radial direction. More specifically, it is preferable that there is a relationship of $(ta5) \leq (tb5) \leq 2 \times (ta5)$, between the radial width (thickness) ta5 of each of the second air flow channels (51, 52, 53) constituting the outer air flow-channel group 5, and the radial width (thickness) tb5 of each of the partition portions (51b and 52b).

Further, in view of facilitating the control of the first straight outer flow group ejected from the outer air flow-channel group 5, it is preferable that the respective radial widths (thicknesses) ta5 (ta51, ta52 and ta53) of the second air flow channels (51, 52, 53) are equal to each other, and it is preferable that the respective radial widths (thicknesses) tb5 (tb51, tb52) of the partition portions (51b, 52b) are equal to each other.

Further, in the present embodiment, it is preferable that there are relationships of $1.5 \times (ta5) \leq (ta2) \leq 2.5 \times (ta5)$, and $1.5 \times (ta5) \leq (ta11) \leq 2.5 \times (ta5)$, between the radial width (thickness) ta5 (ta51, 5a52 and ta53) of the second air flow channels (51, 52, 53) constituting the outer air flow-channel group 5, the radial width (ta2) of the powdered-solid-fuel flow channel 2, and the radial width (ta11) of the first air flow channel 11. Further, it is preferable that there is a relationship of $1.5 \times (tb5) \leq (tb11) \leq 2.5 \times (tb5)$, between the radial width t5b (tb51, tb52) of the partition portions (51b, 52b) and the radial width (tb11) of the partition portion between the powdered-solid-fuel flow channel 2 and the first air flow channel 11.

Namely, in order to merge the three air flows ejected from the respective second air flow channels (51, 52, 53) constituting the outer air flow-channel group 5 to form a single larger straight air flow, it is more preferable that the radial width ta5 of each second air flow channel (51, 52, 53) is about ½ the radial widths (ta2, ta11) of the other flow channels (2, 11), and the radial interval tb5 between the respective second air flow channels (51, 52, 53) is about ½ the radial interval tb11 between the other flow channels (2, 11). If the radial widths (ta2, ta11) of the other flow channels (2, 11) are equal to or more than three times the radial width ta5 of each second air flow channels (51, 52, 53) or if the radial interval tb11 between the other flow channels (2, 11) is equal to or more than three times the radial interval tb5 between the respective second air flow channels (51, 52, 53), this increases the size of the burner device, which causes difficulty in introducing it into current equipment.

In the present embodiment, the three second air flow channels (51, 52, 53) constituting the outer air flow-channel group 5 are adapted such that air flows ejected from each of the second air flow channels can be controlled in flow rate, independently. This will be described with reference to FIG. 3.

Figure 3:
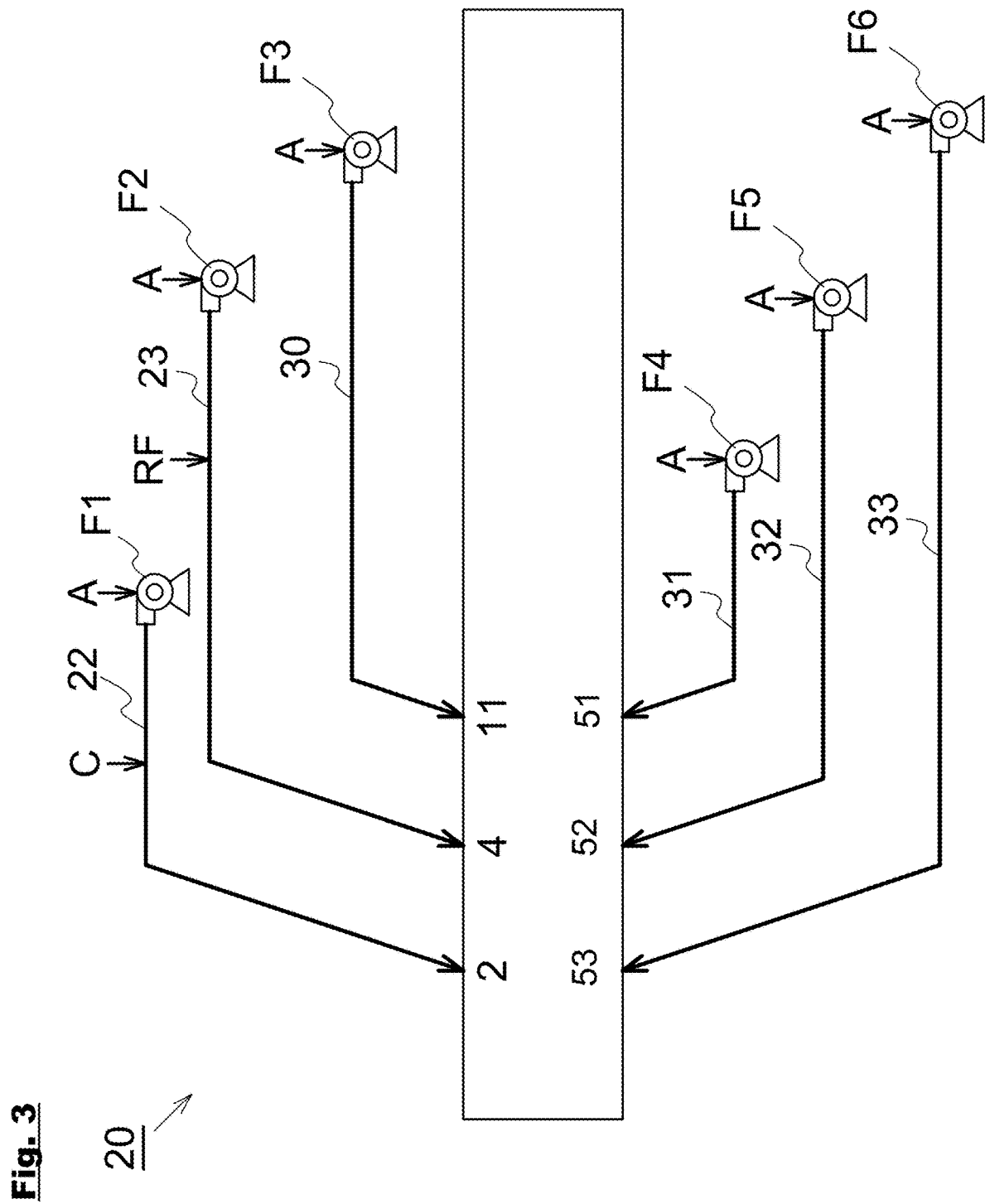
FIG. 3 is a view schematically illustrating an example of the structure of a cement kiln burner system including the cement kiln burner device illustrated in FIG. 1.

FIG. 3 is a view schematically illustrating an example of the structure of a cement kiln burner system including the cement kiln burner device 1 illustrated in FIG. 1. The cement kiln burner system 20 illustrated in FIG. 3 is structured in such a way as to place importance on facilitating the control, and this cement kiln burner system 20 includes six blowing fans F1 to F6.

A pulverized coal C (corresponding to "a powdered solid fuel") supplied to a pulverized-coal transfer pipe 22 is supplied to the powdered-solid-fuel flow channel 2 in the cement kiln burner device 1, through air flows formed by the blowing fan F1. A combustible solid waste RF supplied to a combustible-solid-waste transfer pipe 23 is supplied to the combustible-solid-waste flow channel 4 in the cement kiln burner device 1, through air flows formed by the blowing fan F2. Air supplied from the blowing fan F3 is supplied, as combustion air A, to the first air flow channel 11 in the cement kiln burner device 1, through an air pipe 30.

Air supplied from the blowing fan F4 is supplied, as combustion air A, to the second air flow channel 51 constituting the outer air flow-channel group 5 in the cement kiln burner device 1, through an air pipe 31.

Air supplied from the blowing fan F5 is supplied, as combustion air A, to the second air flow channel 52 constituting the outer air flow-channel group 5 in the cement kiln burner device 1, through an air pipe 32.

Air supplied from the blowing fan F6 is supplied, as combustion air A, to the second air flow channel 53 constituting the outer air flow-channel group 5 in the cement kiln burner device 1, through an air pipe 33.

The cement kiln burner system 20 illustrated in FIG. 3 is capable of controlling the amounts of air flowing through the respective flow channels (2, 4, 11, 51, 52, 53), independently of each other, through the blowing fans (F1 to F6). This enables easily performing adjustments for providing optimum burner flame suitable for the type of the powdered solid fuel such as pulverized coal, petroleum coke or other solid fuels, the type of the combustible solid waste such as waste plastic, meat-and-bone meal or biomass, and various cement-kiln operating environments.

Incidentally, in the present specification, the term "biomass" refers to organic resources (except fossil fuels) derived from living things, which are usable as fuels and the like. For example, the term "biomass" corresponds to shredded waste tatamis, shredded waste construction woods, wood chips, saw dusts and the like.

Further, the cement kiln burner device 1 can be also supplied, through the oil flow channel 3, with heavy oil or the like for use in ignition or can be also supplied with a solid fuel other than pulverized coal or a liquid fuel such as heavy oil (not illustrated), which is to be subjected to mixed combustion together with pulverized coal during normal running.

Further, in the present embodiment, as illustrated in FIG. 1(b), the powdered-solid-fuel flow channel 2 and the first air flow channel 11 include swirl means including the swirl vanes (2a, 11a). Besides the amounts of air flowing through the respective flow channels (2, 4, 11, 51, 52, 53), the swirl angles (degrees) of air flows ejected from the powdered-solid-fuel flow channel 2 or the first air flow channel 11 may be also important factors for providing optimum burner flame suitable for the cement-kiln operating environment.

Figure 4:
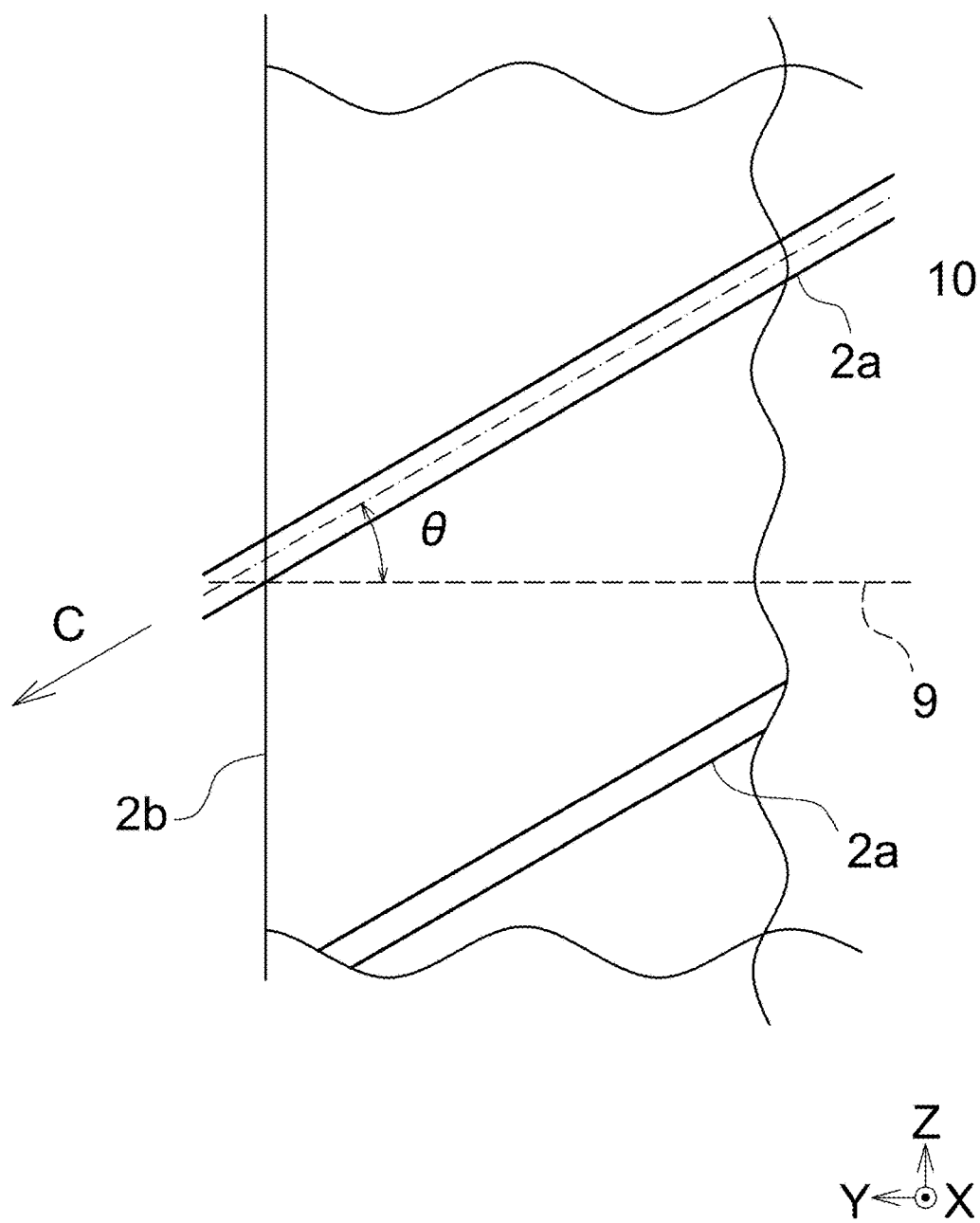
FIG. 4 is a schematic view for explaining the swirl angles of swirl vanes included in the cement kiln burner device.

The swirl angles of air flows ejected from the powdered-solid-fuel flow channel 2 and the like depend on the swirl angles of the swirl vanes (2a, 11a) secured to the burner tip portions in the respective flow channels. When the cylindrical member to which the swirl vane (2a, 11a) is secured is developed in a plane as illustrated in FIG. 4, the swirl angle of this swirl vane is the angle θ formed between the axis 9 of the cement kiln burner device 1 and the center line 10 of the swirl vane, as illustrated in FIG. 1(b), for example. The swirl angle of this swirl vane is coincident with the swirl angle of powdered solid fuel flows or first swirl inner flows at the burner tip. In FIG. 4, as an example, there is illustrated the swirl vane 2a in the powdered-solid-fuel flow channel 2, in which the direction of ejection of the pulverized coal C (the powdered solid fuel) at the tip end position 2b in the powdered-solid-fuel flow channel 2 is rotated by the angle θ with respect to the direction of the axis 9 of the cylindrical member (the Y direction in the figure). The swirl angle of the swirl vane (11a) in the first air flow channel 11 for forming first swirl inner flows can be also defined similarly to the swirl angle of the swirl vane 2a.

As described above, the cement kiln burner device 1 according to the present embodiment is a 5-channel type burner device including the four air flow channels (11, 51, 52 and 53), in addition to the powdered-solid-fuel flow channel 2. Further, during running of the cement kiln burner device 1, the amounts of air flowing through the respective flow channels (2, 4, 11, 51, 52, 53) can be controlled, by controlling running of the six blowing fans (F1 to F6) included in the cement kiln burner system 20. Particularly, the amounts of air flowing through the three second flow channels (51, 52, 53) constituting the outer air flow-channel group 5 can be controlled, for each of the second flow channels (51, 52, 53). This enables controlling, in various manners, the shape, the flow rate, the flow velocity and the like of the single larger air flow from the outer air flow-channel group 5, which is acted by air flows having been ejected from these second air flow channels (51, 52, 53) and having been merged. Further, in addition thereto, before use of the cement kiln burner device 1, the swirl vanes (2a, 11a) provided in the powdered-solid-fuel flow channel 2 and the first air flow channel 11 can be adjusted in swirl angle. With this structure, it is possible to perform control in various manners as required.

Figure 5:
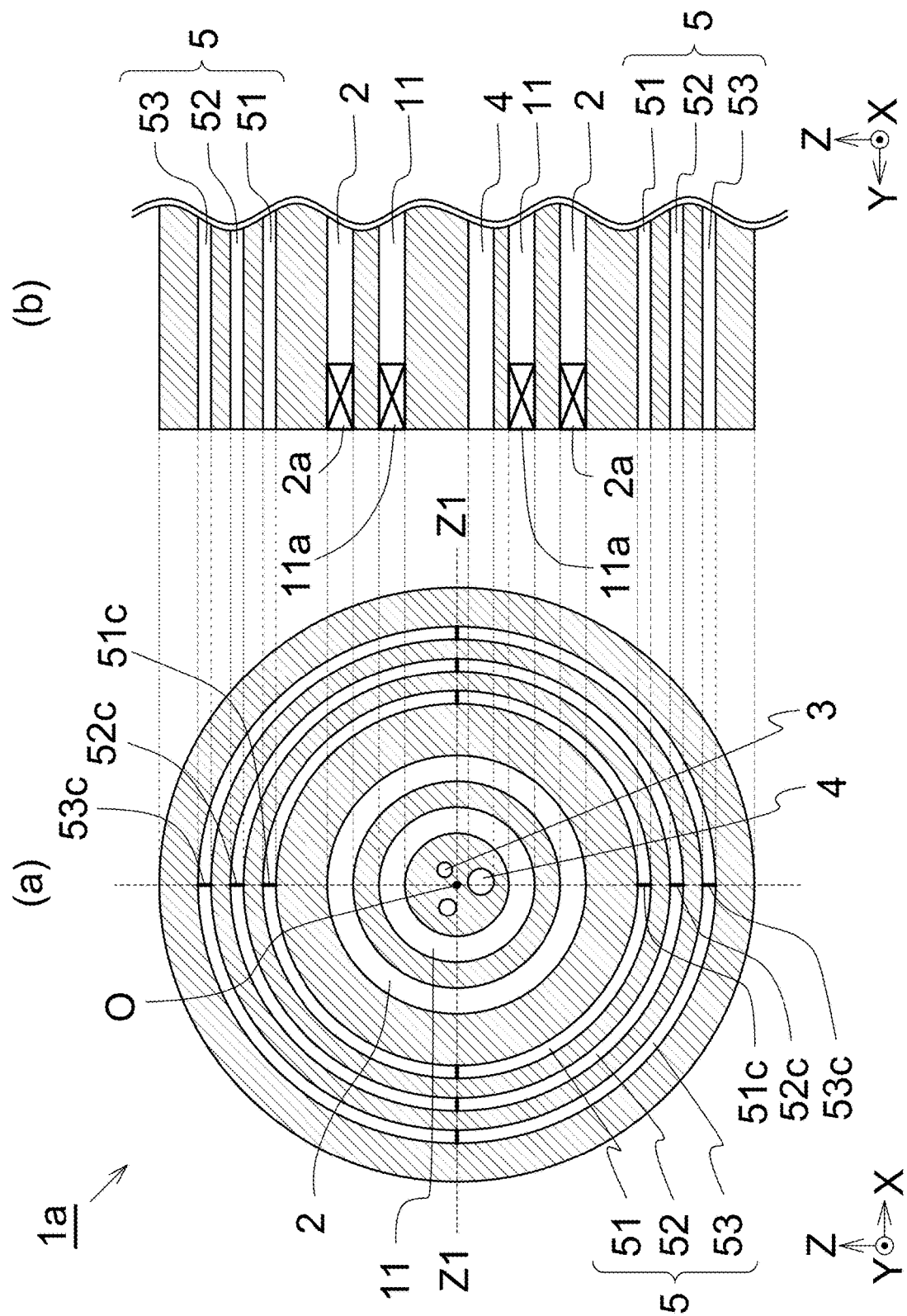
FIG. 5 is a view schematically illustrating a cement kiln burner device according to the present invention, in another embodiment, at its tip-end portion.

FIG. 5 is a view schematically illustrating a cement kiln burner device according to the present invention, in another embodiment, at its tip end portion. Similarly to in FIG. 1, in FIG. 5, (a) is a lateral cross-sectional view of the cement kiln burner device, and (b) is a longitudinal cross-sectional view of the same.

Figure 6:
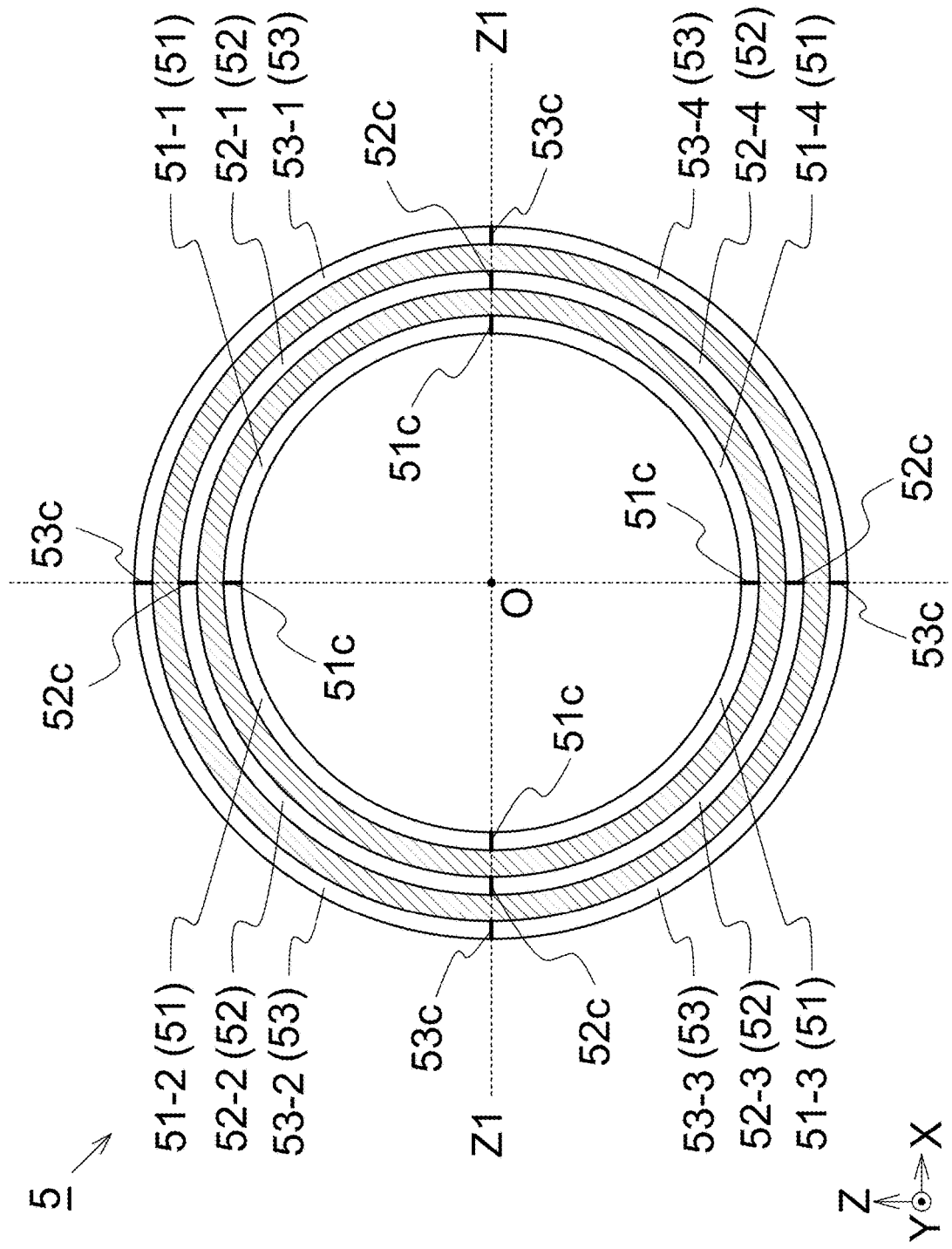
FIG. 6 is a schematic view illustrating second air flow channels constituting an outer air flow-channel group, which are extracted from FIG. 5.

The cement kiln burner device 1a illustrated in FIG. 5 is different from the cement kiln burner device 1 illustrated in FIG. 1, in that three second air flow channels (51, 52, 53) constituting an outer air flow-channel group 5 are evenly divided into four sections in the circumferential direction, but the other portions are the same. This will be described with reference to FIG. 6. FIG. 6 is a view enlarging the three second air flow channels (51, 52, 53) constituting the outer air flow-channel group 5, which are extracted from the drawing of FIG. 5(a).

As illustrated in FIG. 6, the second air flow channel 51 is divided into four opening portions (51-1, 51-2, 51-3 and 51-4), by partition portions 51c placed at four positions spaced apart from each other in the circumferential direction. Similarly, the second air flow channel 52 is divided into four opening portions (52-1, 52-2, 52-3 and 524), by partition portions 52c placed at four positions spaced apart from each other in the circumferential direction, and the second air flow channel 53 is divided into four opening portions (53-1, 53-2, 53-3 and 53-4), by partition portions 53c placed at four positions spaced apart from each other in the circumferential direction.

In the present embodiment, the respective partition portions (51c, 52c and 53c) are placed at positions at common deflection angles on polar coordinates having an origin point at the axis center O. Namely, the opening portion 51-1, the opening portion 52-1 and the opening portion 53-1, which are provided in the different second air flow channels (51, 52, 53), are placed in concentric circular-arc shapes, at positions at a common deflection angle on the polar coordinates having an origin point at the axis center O. The same applies to the relationship between the opening portions 51-2, 52-2 and 53-2, the relationship between the opening portions 51-3, 52-3 and 53-3, and the relationship between the opening portions 51-4, 52-4 and 534.

Namely, the cement kiln burner device 1a illustrated in FIG. 5 includes a powdered-solid-fuel flow channel 2, a first air flow channel 11 placed inside the powdered-solid-fuel flow channel 2 adjacent thereto, and the three second air flow channels (51, 52 and 53) constituting the outer air flow-channel group 5 placed at an outermost position outside the powdered-solid-fuel flow channel 2, in which each of the second flow channels (51, 52 and 53) is divided into the four opening portions. Namely, the cement kiln burner device 1a illustrated in FIG. 5 includes a total of 14 air flow channels. Further, the positional relationship between the three second air flow channels (51, 52 and 53) constituting the outer air flow-channel group 5 is the same as that in FIG. 2 and, therefore, is not described herein.

Figure 7:
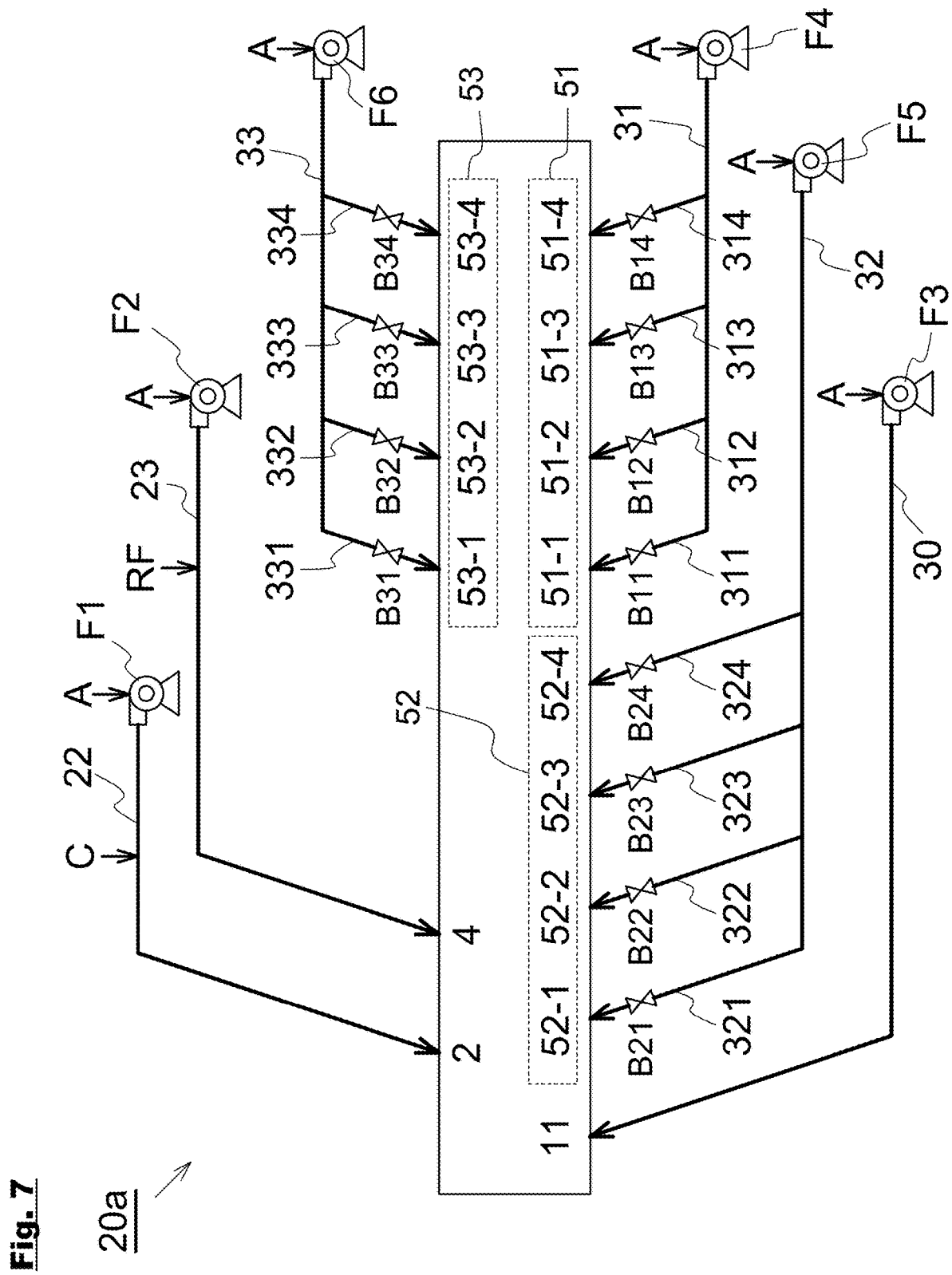
FIG. 7 is a view schematically illustrating an example of the structure of a cement kiln burner system including the cement kiln burner device illustrated in FIG. 5.

FIG. 7 is a view schematically illustrating an example of the structure of a cement kiln burner system including the cement kiln burner device 1a illustrated in FIG. 6. The cement kiln burner system 20a illustrated in FIG. 7 is structured in such a way as to place importance on facilitating the control and includes six blowing fans F1 to F6, and 12 variable gas valves (B11 to B14, B21 to B24, and B31 to B34).

A pulverized-coal transfer pipe 22 to which the blowing fan F1 is connected, a combustible-solid-waste transfer pipe 23 to which the blowing fan F2 is connected, and an air pipe 30 to which the blowing fan F3 is connected are the same as those in the cement kiln burner system 20 illustrated in FIG. 3, in terms of both the structure and applications, and these are not described herein.

Air supplied from the blowing fan F4 is supplied, as combustion air A, to the second air flow channel 51 constituting the outer air flow-channel group 5 in the cement kiln burner device 1, through an air pipe 31. The air pipe 31 is branched by four branch pipes (311, 312, 313, 314), and these branch pipes (311, 312, 313, 314) are respectively communicated with the four opening portions (51-1, 51-2, 51-3, 51-4), which are divisions of the second air flow channel 51 constituting the outer air flow-channel group 5 in the cement kiln burner device 1. More specifically, the branch pipe 311 is communicated with the opening portion 51-1, the branch pipe 312 is communicated with the opening portion 51-2, the branch pipe 313 is communicated with the opening portion 51-3, and the branch pipe 314 is communicated with the opening portion 51-4.

Similarly, an air pipe 32 for supplying combustion air A to the second air flow channel 52 constituting the outer air flow-channel group 5 in the cement kiln burner device 1 from the blowing fan F5 is branched by four branch pipes (321, 322, 323, 324), and these branch pipes are communicated with the four opening portions (52-1, 52-2, 52-3, 52-4), which are divisions of the second air flow channel 52. Similarly, an air pipe 33 for supplying combustion air A to the second air flow channel 53 constituting the outer air flow-channel group 5 in the cement kiln burner device 1 from the blowing fan F6 is branched by four branch pipes (331, 332, 333, 334), and these branch pipes are communicated with the four opening portions (53-1, 53-2, 53-3, 53-4), which are divisions of the second air flow channel 53.

The branch pipes (311 to 314, 321 to 324, 331 to 334) are provided with the respective variable gas valves (B11 to B14, B21 to B24, B31 to B34). By adjusting the degrees of opening of these gas valves (B11 to B14, B21 to B24, B31 to B34), it is possible to control the flow rates of air flows flowing through the respective branch pipes (311 to 314, 321 to 324, 331 to 334), independently of each other.

Namely, in the case of the cement kiln burner device 1a illustrated in FIG. 5, in comparison with the cement kiln burner device 1 illustrated in FIG. 1, the three second air flow channels 51 to 53 constituting the outer air flow-channel group 5 are each divided in the circumferential direction by the four opening portions (51-1 to 51-4, 52-1 to 52-4, 53-1 to 53-4), and the amounts of air flowing through these respective 12 opening portions can be controlled, independently of each other, on an opening-portion by opening-portion basis. This increases the degree of freedom in adjustment, in comparison with the cement kiln burner device 1. This enables adjustments for providing more suitable flame for the cement-kiln operating environment.

Figure 8:
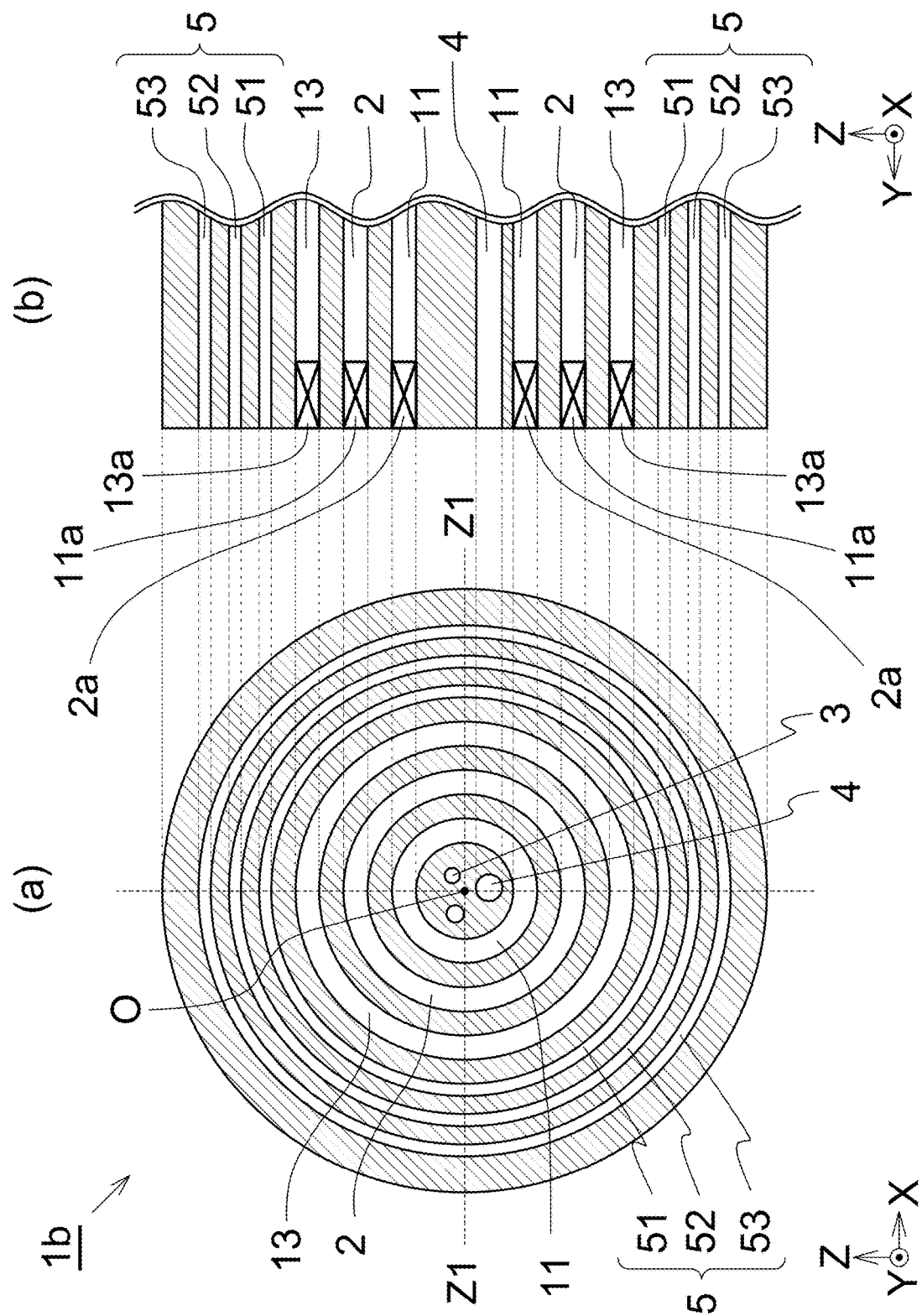
FIG. 8 is a view schematically illustrating a cement kiln burner device according to the present invention, in yet another embodiment, at its tip-end portion.

FIG. 8 is a view schematically illustrating a cement kiln burner device according to the present invention, in yet another embodiment, at its tip end portion. Similarly to in FIG. 1, in FIG. 8, (a) is a lateral cross-sectional view of the cement kiln burner device, and (b) is a longitudinal cross-sectional view of the same.

The cement kiln burner device 1b illustrated in FIG. 8 is different from the cement kiln burner device 1 illustrated in FIG. 1, in that there is placed a third air flow channel 13 (first swirl outer flows), between a powdered-solid-fuel flow channel 2 and an outer air flow-channel group 5, but the other portions are the same. Namely, the cement kiln burner device 1 illustrated in FIG. 8 includes a total of 6 air flow channels, which are the powdered-solid-fuel flow channel 2, a first air flow channel 11 placed inside the powdered-solid-fuel flow channel 2 adjacent thereto, the third air flow channel 13 placed outside the powdered-solid-fuel flow channel 2 adjacent thereto, and three second air flow channels (51, 52 and 53) constituting the outer air flow-channel group 5 placed at an outermost position outside the third air flow channel 13.

In the third air flow channel 13, a swirl vane (13a) as swirl means is secured to the burner tip end portion (see FIG. 8(b)). Namely, in the present embodiment, in the powdered-solid-fuel flow channel 2, the first air flow channel 11 and the third air flow channel 13, the swirl vanes (2a, 11a, and 13a) as swirl means are secured to the burner tip end portions in the respective flow channels. Namely, in such a way as to sandwich powdered-solid-fuel flows ejected from the powdered-solid-fuel flow channel 2, air flows ejected from the first air flow channel 11 form swirl air flows (first swirl inner flows) positioned in an inner side, and air flows ejected from the third air flow channel 13 form swirl air flows (first swirl outer flows) positioned in an outer side. Further, the swirl vane (13a) is adjustable in swirl angle at the time point before the start of operation of the cement kiln burner device 1, similarly to the swirl vanes (2a, 11a). Further, the swirl angle of the swirl vane 13a is defined as the same as that of the swirl vane 2a which has been described above with reference to FIG. 4.

Figure 9:
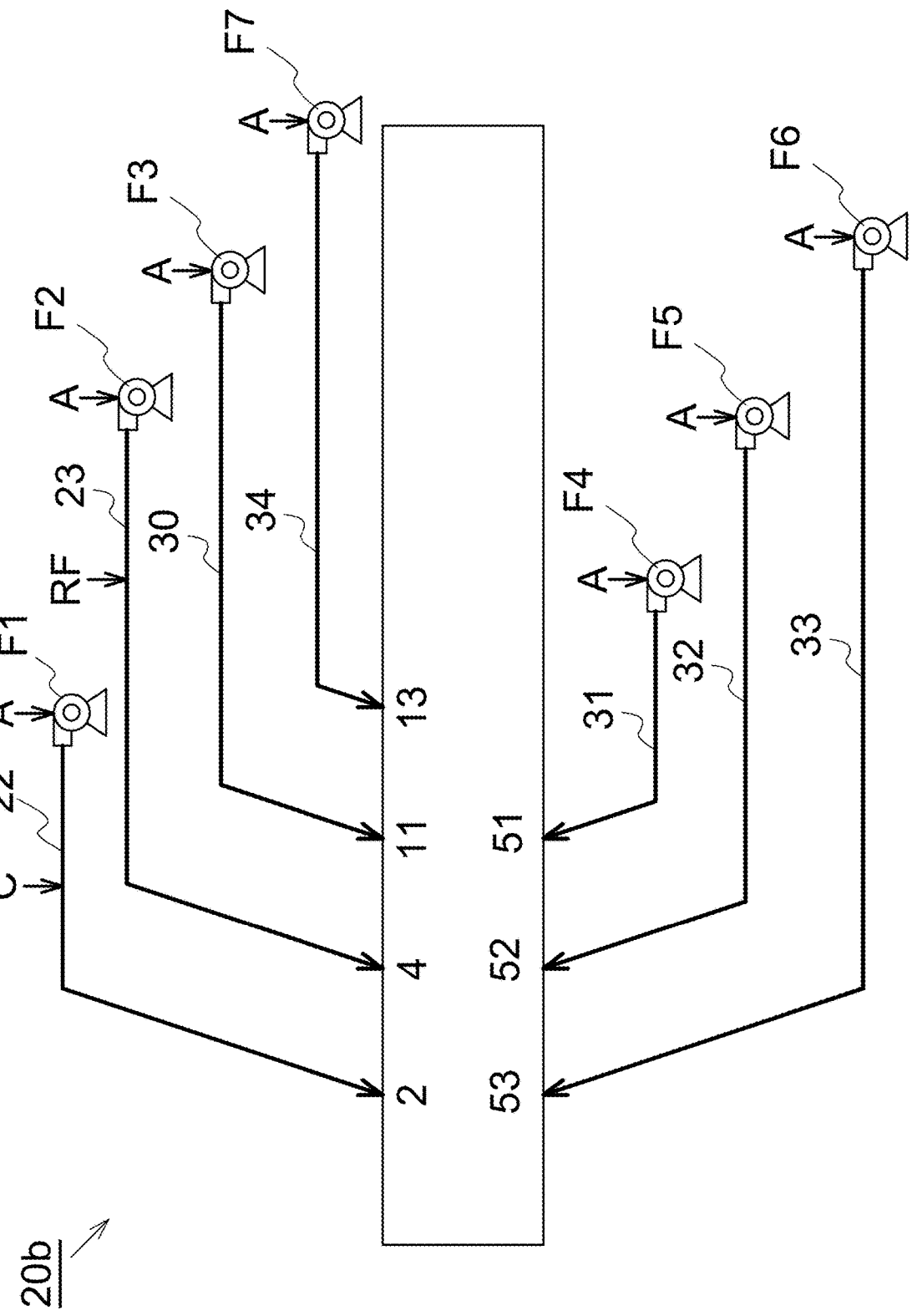
FIG. 9 is a view schematically illustrating an example of the structure of a cement kiln burner system including the cement kiln burner device illustrated in FIG. 8.

FIG. 9 is a view schematically illustrating an example of the structure of a cement kiln burner system including the cement kiln burner device 1b illustrated in FIG. 8. The cement kiln burner system 20b illustrated in FIG. 9 is structured in such a way as to place importance on facilitating the control and includes seven blowing fans F1 to F7.

Air supplied from the blowing fan F7 is supplied, as combustion air A, to the third air flow channel 13 in the cement kiln burner device 1, through an air pipe 34. The other structures are the same as those of the cement kiln burner system 20 illustrated in FIG. 3 and, therefore, are not described herein.

The cement kiln burner system 20b illustrated in FIG. 9 is capable of controlling the amount of air flowing through each of the flow channels (2, 4, 11, 13, 51, 52, 53), independently, through the blowing fans (F1 to F7). This enables easily providing optimum burner flame suitable for the type of the powdered solid fuel such as pulverized coal, petroleum coke or other solid fuels, the type of the combustible solid waste such as waste plastic, meat-and-bone meals or biomasses, and various cement-kiln operating environments. Furthermore, this enables sufficiently reducing NOx contained in the exhaust gas.

Figure 10:
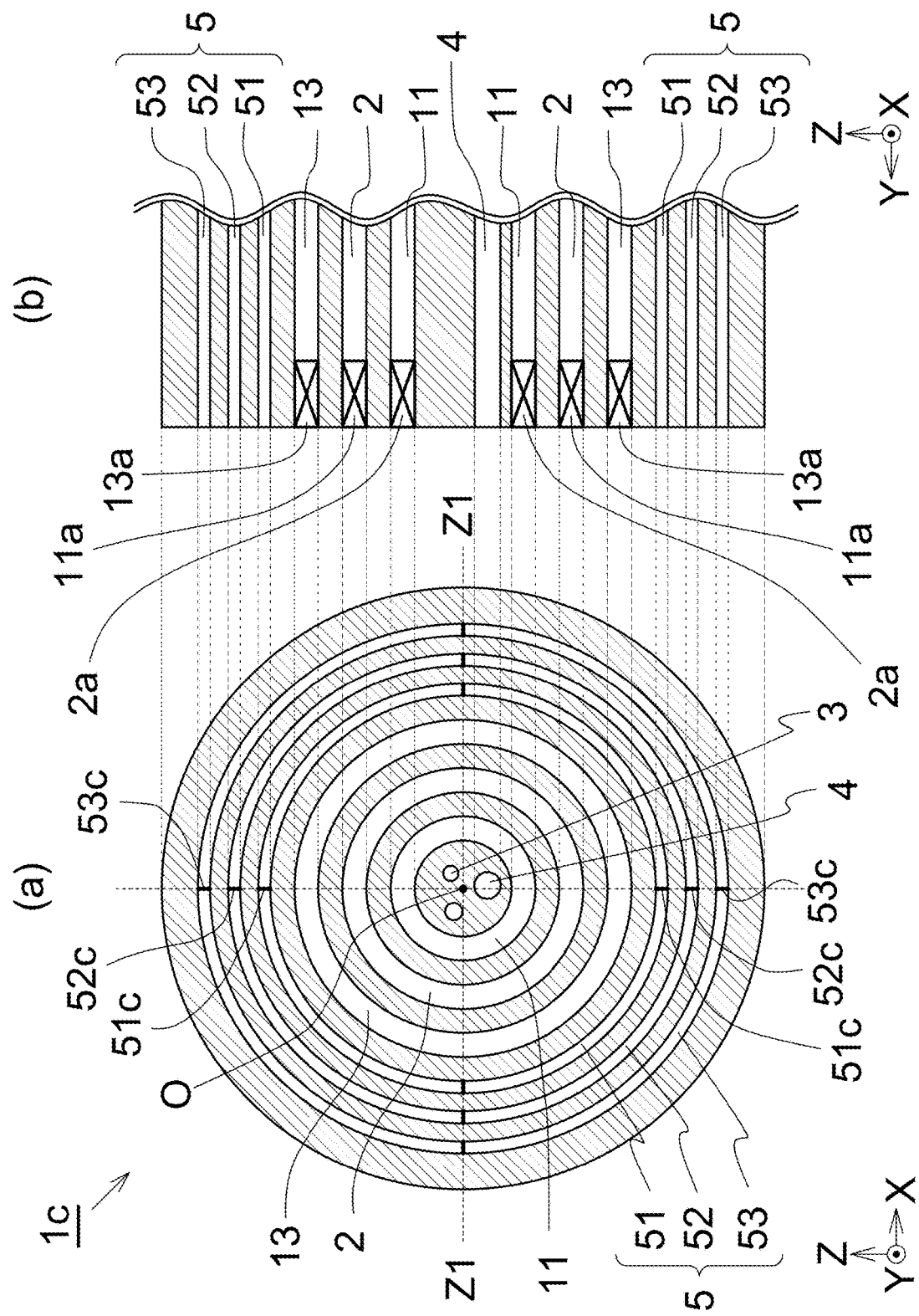
FIG. 10 is a view schematically illustrating a cement kiln burner device according to the present invention, in yet another embodiment, at its tip-end portion.

FIG. 10 is a view schematically illustrating a cement kiln burner device according to the present invention, in yet another embodiment, at its tip end portion. Similarly to in FIG. 1, in FIG. 10, (a) is a lateral cross-sectional view of the cement kiln burner device, and (b) is a longitudinal cross-sectional view of the same.

The cement kiln burner device 1c illustrated in FIG. 10 is different from the cement kiln burner device 1b illustrated in FIG. 8, in that three second air flow channels (51, 52, 53) constituting an outer air flow-channel group 5 are evenly divided into four sections in the circumferential direction by partition portions (51c, 52c and 53c), but the other portions are the same. Namely, the cement kiln burner device 1c illustrated in FIG. 10 includes a powdered-solid-fuel flow channel 2, a first air flow channel 11 placed inside the powdered-solid-fuel flow channel 2 adjacent thereto, a third air flow channel 13 placed outside the powdered-solid-fuel flow channel 2 adjacent thereto, and the three second air flow channels (51, 52 and 53) constituting the outer air flow-channel group 5 placed at an outermost position outside the third air flow channel 13, in which each of the second flow channels (51, 52 and 53) is divided into the four opening portions. Namely, the cement kiln burner device 1c illustrated in FIG. 10 includes a total of 15 air flow channels.

The three second flow channels (51, 52 and 53) constituting the outer air flow-channel group 5 are each divided into the plural opening portions in the circumferential direction by the respective partition portions (51c, 52c and 53c), which is the same as that in the aspect illustrated in FIG. 6 and is not described herein.

Figure 11:
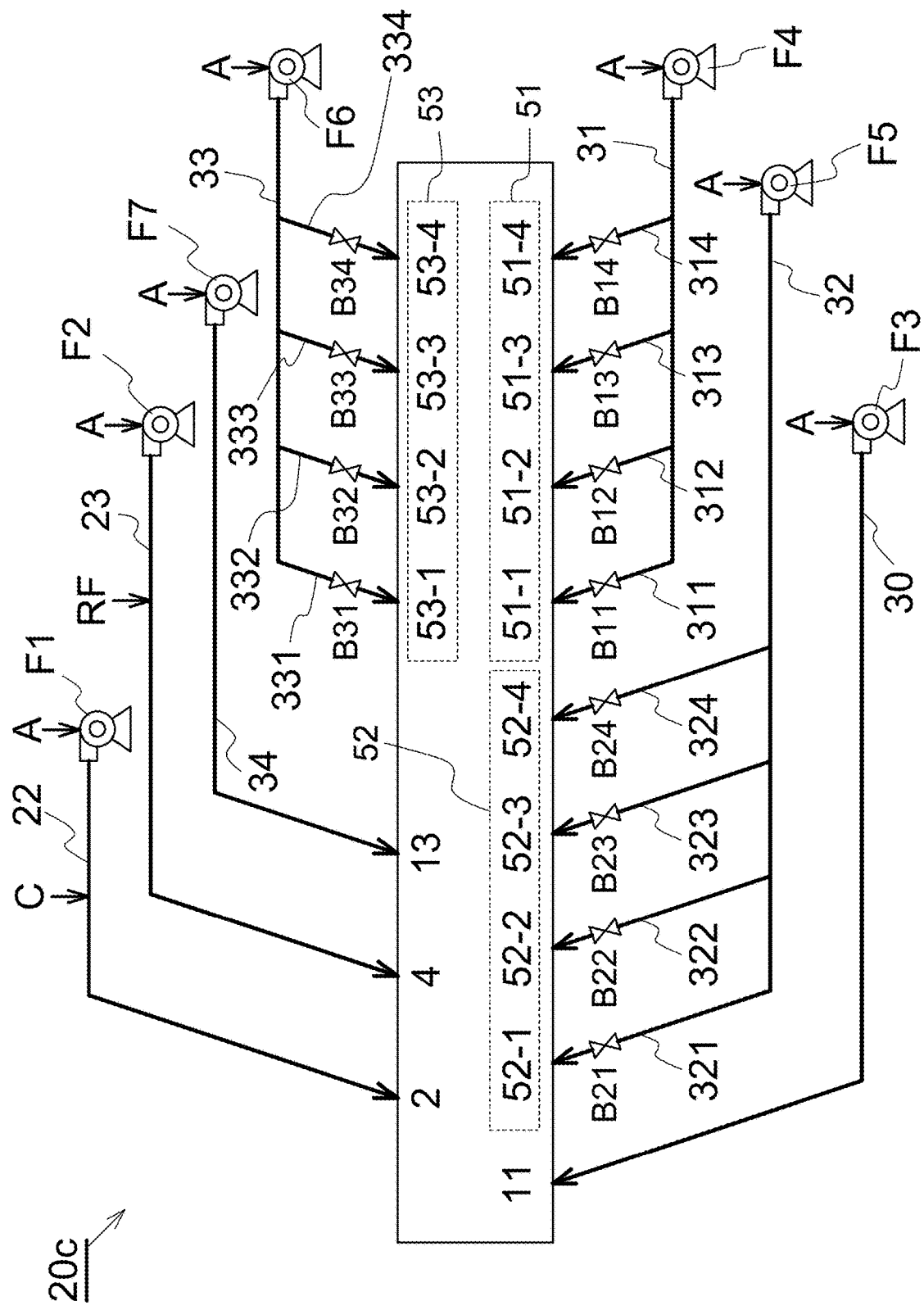
FIG. 11 is a view schematically illustrating an example of the structure of a cement kiln burner system including the cement kiln burner device illustrated in FIG. 10.

FIG. 11 is a view schematically illustrating an example of the structure of a cement kiln burner system including the cement kiln burner device 1c illustrated in FIG. 10. The cement kiln burner system 20c illustrated in FIG. 11 is structured in such a way as to place importance on facilitating the control and includes seven blowing fans F1 to F7, and 12 variable gas valves (B11 to B14, B21 to B24, and B31 to B34).

In the cement kiln burner system 20a illustrated in FIG. 11, a pulverized-coal transfer pipe 22 to which the blowing fan F1 is connected, a combustible-solid-waste transfer pipe 23 to which the blowing fan F2 is connected, and an air pipe 30 to which the blowing fan F3 is connected are the same as those in the cement kiln burner system 20 illustrated in FIG. 3, in terms of both the structure and applications, and are not described herein. Further, four branch pipes (311 to 314) which are branches of an air pipe 31 to which the blowing fan F4 is connected, four branch pipes (321 to 324) which are branches of an air pipe 32 to which the blowing fan F5 is connected, four branch pipes (331 to 334) which are branches of an air pipe 33 to which the blowing fan F6 is connected, and the respective gas valves (B11 to B14, B21 to B24, and B31 to B34) are the same as those in the cement kiln burner system 20a illustrated in FIG. 7, in terms of both the structure and applications. Further, an air pipe 34 to which the blowing fan F7 is connected is the same as that in the cement kiln burner system 20b illustrated in FIG. 9, in terms of both the structure and applications.

Namely, the cement kiln burner system 20c illustrated in FIG. 11 is capable of controlling the amount of air flowing through each of the flow channels and the opening portions (2, 4, 11, 13, 51-1 to 51-4, 52-1 to 52-4, 53-1 to 53-4), independently, through the blowing fans (F1 to F7) and the variable gas valves (B11 to B14, B21 to B24, and B31 to B34). This enables easily performing control for providing optimum burner flame suitable for the type of the powdered solid fuel such as pulverized coal, petroleum coke or other solid fuels, the type of the combustible solid waste such as waste plastic, meat-and-bone meal or biomass, and various cement-kiln operating environments. Furthermore, this enables sufficiently reducing NOx contained in the exhaust gas.

The present inventors found basic limitation regions for optimizing control factors, by conducting analyses about flame shapes, gas temperature distributions within cement kilns, oxygen concentration distributions within cement kilns, degrees of turbulences exhibited by air flows within cement kilns, and the like, through combustion simulations (software: FLUENT manufactured by ANSYS JAPAN K.K.) for the aforementioned cement kiln burner devices (1, 1a, 1b, 1c).

The following Tables 1 and 2 represent examples of basic limitation regions found under the following burner combustion conditions. Incidentally. Table 1 corresponds to the cement kiln burner device 1 illustrated in FIG. 1, and Table 2 corresponds to the cement kiln burner device 1c illustrated in FIG. 10.

<Burner Combustion Conditions>

The amount of pulverized coal C combusted: 15 t/hour

The amount of waste plastic (non-rigid plastic) as combustible solid waste RF which was processed: 3 t/hour The size of waste plastic as combustible solid waste RF: a circular sheet shape with a diameter of 30 mm which was formed by punching a sheet with a thickness of 0.5 mm The amount and the temperature of secondary air: 150000 Nm3/hour, 800 degrees C.

The diameter of the burner tip of the cement kiln burner device (1, 1c): 700 mm

TABLE 1

| | Cement kiln burner device 1 (FIG. 1) | | | | |
|---|---|---|---|---|---|
| | Flow channel number (FIG. 1) | Flow velocity of air flow at burner tip (m/s) | Primary air ratio (volume %) | Opening-portion utilization rate (number) | Swirl angle (degree) |
| Powdered solid fuel flow | 2 | 30~80 | 2~6 | — | 0~15 |
| First swirl inner flow | 11 | 5~240 | 1~5 | — | 30~50 |
| Outer air flow-channel group (first straight outer flow group) | 5 51 52 53 | 0~400 | 1~7 | 1/3~3/3 | 0 |
| Combustible solid waste flow | 4 | 30~80 | 2~6 | — | 0 |

TABLE 2

| | Cement kiln burner device 1c (FIG. 10) | | | | |
|---|---|---|---|---|---|
| | Flow channel number (FIGS. 10 and 8) | Flow velocity of air flow at burner tip (m/s) | Primary air ratio (volume %) | Opening-portion utilization rate (number) | Swirl angle (degree) |
| Powdered solid fuel flow | 2 | 30~80 | 2~6 | — | 0~15 |

TABLE 2-continued

Cement kiln burner device 1c (FIG. 10)

|  | Flow channel number (FIGS. 10 and 8) | Flow velocity of air flow at burner tip (m/s) | Primary air ratio (volume %) | Opening-portion utilization rate (number) | Swirl angle (degree) |
| --- | --- | --- | --- | --- | --- |
| First swirl inner flow | 11 | 5~240 | 1~5 | — | 30~50 |
| First swirl outer flow | 13 | 60~240 | 1~5 | — | 1~50 |
| Outer air flow-channel group (first straight outer flow group) | 5  51-1~51-4 (51) 52-1~52-4 (52) 53-1~53-4 (53) | 0~400 | 1~7 | 1/12~12/12 | 0 |
| Combustible solid waste flow | 4 | 30~80 | 2~6 | — | 0 |

Table 1 enumerates, as basic limitation regions, the flow velocity (m/s) of air flows at the burner tip, the primary-air ratio (volume %), the swirl angles of the swirl vanes (2a, 11a), and the opening-portion utilization rate (number), in the aforementioned powdered-solid-fuel flow channel 2, the first air flow channel 11 (for forming first swirl inner flows), the three second air flow channels (51 to 53) (constituting the outer air flow-channel group 5), and the combustible-solid-waste flow channel 4.

Incidentally, in the present specification, the term "the primary-air ratio" refers to the ratio of the amount of primary air to the theoretical amount of combustion air (A0 ratio). Further, the term "the opening-portion utilization rate" refers to the number of areas through which air flows can pass, with respect to the total number of flow channels constituting the outer air flow-channel group 5. More specifically, in cases where the second air flow channels (51 to 53) constituting the outer air flow-channel group 5 are divided into two or more opening portions (51-1 to 51-4, 52-1 to 52-4 and 53-1 to 53-4), the term "the opening-portion utilization rate" refers to the ratio of the number of the opening portions which eject air flows to the total number of opening portions. Further, in cases where the second air flow channels (51 to 53) are not each divided by respective opening portions (51-1 to 51-4, 52-1 to 52-4 and 53-1 to 53-4), the term "the opening-portion utilization rate" refers to the ratio of the number of the opening portions which eject air flows to the total number of opening portions, by regarding each one of the second air flow channel (51 to 53) as a single opening portion.

Similarly, Table 2 enumerates, as basic limitation regions, the flow velocity (m/s) of air flows at the burner tip, the primary-air ratio (volume %), the swirl angles of the swirl vanes (2a, 11a, 13a), and the opening-portion utilization rate (number), in the aforementioned powdered-solid-fuel flow channel 2, the first air flow channel 11 (for forming first swirl inner flows), the third air flow channel 13 (for forming first swirl outer flows), the three second air flow channels (51 to 53) (constituting the outer air flow-channel group 5), and the combustible-solid-waste flow channel 4.

In the case of the cement kiln burner device 1 illustrated in FIG. 1 or the cement kiln burner device 1b illustrated in FIG. 8, the flow velocity (m/s), at the burner tip, of air flows ejected from the three second air flow channels (51 to 53) constituting the outer air flow-channel group 5 is important in particular, among the aforementioned respective items. Further, in the case of the cement kiln burner device 1a illustrated in FIG. 5 or the cement kiln burner device 1c illustrated in FIG. 10, the flow velocity (m/s), at the burner tip, of air flows ejected from the opening portions (51-1 to 51-4, 52-1 to 52-4 and 53-1 to 53-4), which are the divisions of the three second air-flow channels (51 to 53), is important in particular.

This is because of the following reason. That is, in order to facilitate adjustments for providing optimum flame suitable for the cement-kiln operating environment, there is a need for arbitrarily forming an area within which air flows ejected from the kiln burner form turbulent flows, within burner flame, as described above. Namely, by arbitrarily selecting areas through which air flows are passed (the second air flow channels themselves or the opening portions) in the second air flow channels (51 to 53) constituting the outer air flow-channel group 5, and, further, by independently adjusting the flow rates of air flows through the selected flow-passing areas, it is possible to easily control the area within which turbulent flows are formed in burner flame, thereby elongating or shortening burner flame.

Further, as in the cement kiln burner device 1a illustrated in FIG. 5 or the cement kiln burner device 1c illustrated in FIG. 10, in cases where the second air flow channels (51 to 53) includes divisional opening portions (51-1 to 51-4, 52-1 to 52-4 and 53-1 to 53-4), it is possible to make the respective flow rates of air flows through the second air flow channels (51 to 53) different from each other in the circumferential direction. For example, in order to combust the combustible solid waste RF maintained at a floating state, it is necessary to sufficiently form an area within which air flows form turbulent flows in the upward direction (+Z direction) within burner flame. With the aforementioned cement kiln burner device (1a, 1c), it is possible to control the flow rates of air flows passing through the respective opening portions (51-1 to 51-4, 52-1 to 52-4 and 53-1 to 53-4), on an opening-portion by opening-portion basis. This enables arbitrarily forming upward turbulent flows with higher intensity in flame, to such an extent as to impose no influence on the calcination for cement clinker.

In view of the aforementioned circumstance, it is preferable that the respective air flows ejected from the three second air flow channels (51 to 53) constituting the outer air flow-channel group 5 positioned in the outermost side, and from the respective opening portions (51-1 to 51-4, 52-1 to 52-4 and 53-1 to 53-4) which are the divisions of the second air flow channels (51 to 53) have flow velocities of 0 m/s to 400 m/s, at the burner tip. Namely, no air flow may be ejected from certain second air flow channels or certain opening portions, in some cases. However, this excepts cases where no air flow is ejected from the outer air flow-channel group 5 at all.

Further, the total amount of primary air ejected from the three second air flow channels (51 to 53) constituting the outer air flow-channel group 5 positioned in the outermost side and from the respective opening portions (51-1 to 51-4, 52-1 to 52-4 and 53-1 to 53-4) which are the divisions of the second air flow channels (51 to 53), namely the amount of primary air (m3N/min) supplied by the blowing fans F4 to F6, is a largest amount of air, out of those in the powdered-solid-fuel flows, the combustible-solid-waste flows and all the other primary air flows. If the amount of primary air supplied by the blowing fans F4 to F6 is smaller than the amounts of primary air in the other air flows, this may cause insufficient formation of turbulent flows in burner flame.

Further, if the air flows ejected from the three second air flow channels (51 to 53) constituting the outer air flow-channel group 5 positioned in the outermost side and from the respective opening portions (51-1 to 51-4, 52-1 to 52-4, 53-1 to 53-4), which are the divisions of the second air flow channels (51 to 53), have flow velocities exceeding 400 m/s, at the burner tip, this causes excessive formation of turbulent flows in burner flame. This may destabilize a temperature distribution within the cement kiln and, furthermore, may bring a portion of burner flame into direct contact with the cement-clinker raw materials, which may result in degradation of the quality of the produced cement clinker.

Further, in cases where there are opening portions (51-1 to 51-4, 52-1 to 52-4, 53-1 to 53-4) which are divisions of the three second air flow channels (51 to 53), as in the cement kiln burner devices (1*b*, 1*d*), it is preferable that the opening-portion utilization rate (number) is 1/12 to 12/12. In this case, the term "the opening-portion utilization rate" refers to the ratio of the number of the opening portions which eject air flows to the total number of the opening portions in the air flow channels (group) divided into the plural opening portions, as described above.

When the opening-portion rate is less than 1, in a preferable aspect of primary air flows from the outer air flow-channel group 5, air flows are ejected from only the vertically-lower side (−Z-direction side) with respect to a plane which includes the axis center O and is parallel to the axial direction of the concentric cylindrical members, namely an XY plane passing through a line Z1-Z1 in FIG. 5 or 10. More specifically, in FIG. 6, in this aspect, primary air is ejected from the opening portions (51-3, 51-4, 52-3, 52-4, 53-3, 53-4), while no primary air is ejected from the opening portions (51-1, 51-2, 52-1, 52-2, 53-1, 53-2).

Further, in the aforementioned preferable aspect, it is not necessarily necessary to stop the ejection of primary air from the opening portions (51-1, 51-2, 52-1, 52-2, 53-1, 53-2) in the vertically-upper side (+Z-direction side). Namely, by independently controlling primary air flows from the opening portions in the vertically-upper side (+Z-direction side) and primary air flows from the opening portions in the vertically-lower side (−Z-direction side), it is possible to lower the flow velocities of primary air flows from the opening portions in the vertically-upper side (+Z-direction side), while heightening the flow velocities of primary air flows from the opening portions in the vertically-lower side (−Z-direction side), thereby attaining the aforementioned preferable aspect. With this formation method, it is possible to adjust the state of formation of turbulent flows within burner flame, without changing the total amount of primary air ejected from the outer air flow-channel group 5.

Further, in cases where there is provided the third air flow channel 13 (first swirl outer flows) as in the cement kiln burner device 1*c* illustrated in FIG. 10, air flows (a first straight outer flow group) ejected from the outer air flow-channel group 5 are influenced by the swirling of swirl outer flows from the third air flow channel 13 which is placed inside the outer air flow-channel group 5 adjacent thereto, so that these air flows (the first straight outer flow group) ejected from the outer air flow-channel group 5 are swirled in the same direction as the direction of the swirling of the aforementioned swirl outer flows. In a preferable aspect in view of the aforementioned circumstance, for example, when swirl outer flows from the third air flow channel 13 are ejected in the direction of right-hand screw rotations, it is possible to position air flows (first straight outer flow group) from the outer air flow-channel group 5 in a flame lower portion in flame within the cement kiln, by jetting out primary air flows from the upstream side (−X and +Z area in FIG. 10(*a*) and FIG. 6) in the swirling. As a concrete aspect, in FIG. 6, primary air can be ejected from the opening portions (51-2, 51-3, 52-2, 52-3, 53-2, 53-3), while no primary air can be ejected from the opening portions (51-1, 51-4, 52-1, 52-4, 53-1, 53-4).

As described above, with the aspect of the cement kiln burner device (1*a*, 1*c*) illustrated in FIG. 5 or 10, it is possible to place injection ports (opening portions) for ejecting primary air in the vertically-lower side with respect to the axis center O. This enables forming turbulent flows having ascending effects in burner flame, which enables maintaining even a larger combustible solid waste at a floating state for a longer time period.

Further, in the cement kiln burner device (1*a*, 1*c*) illustrated in FIG. 5 or 10, the second air flow channels (51 to 53) constituting the outer air flow-channel group 5 are each divided into four opening portions. However, the number of divisions of each of the second air flow channels (51 to 53) is not limited to four, and can be also three or five or more. For example, in cases where the second air flow channels (51 to 53) include six or more opening portions, the second air flow channels (51 to 53) can be adapted to include opening portions which eject primary air and opening portions which eject no primary air, alternately adjacent to each other, in order to eject primary air in a spatially-intermittent manner. Further, in this case, similarly, the respective opening portions included in the respective second air flow channels (51 to 53) are placed in concentric circular-arc shapes, at positions at common deflection angles, on polar coordinates having an origin point at the axis center O.

In the outer air flow-channel group 5 having such a number of opening portions and such a placement aspect, by placing the opening portions which eject flows and the opening portions which eject no flow intermittently in the circumferentially direction and, further, by ejecting flows or no flow from all the opening portions placed at positions at the same deflection angle on the polar coordinates, it is possible to supply air flows from the outer air flow-channel group 5, as several bundles of straight outer flows. This results in formation of portions with higher and lower air densities within flame, thereby causing turbulent flows in such a way as to eliminate these density differences.

Further, in the aforementioned aspect, there has been described a case of providing opening portions caused to eject primary air (which will be referred to as "opening portions A1" for convenience), and opening portions caused to eject no primary air (which will be referred to as "opening portions A2" for convenience). However, it is also possible to realize the same function by providing a larger difference in flow rate therebetween. Namely, the opening portions A2 can be either opening portions caused to eject no primary air at all or opening portions caused to eject primary air at a flow rate which is much lower than that of the opening portions A1.

A next most important basic limitation region is the swirl angles (degrees) in the aforementioned powdered-solid-fuel flow channel 2 and the first air flow channel 11 (for forming first swirl inner flows). This is because of the following reason. That is, swirl flows generated from the swirl vanes (2a, 11a) can stabilize ignition in the burner device and, furthermore, can create internal circulations of air flows in burner flame, which provides flame stabilizing functions. Further, the swirl angles of the swirl vanes (2a, 11a) are fixed during operation of the burner device, in general, and cannot be adjusted for optimization during operation.

Further, as in the cement kiln burner device 1a illustrated in FIG. 5 or the cement kiln burner device 1c illustrated in 10, in cases where there is provided the third air flow channel 13 for forming first swirl outer flows, the swirl angle (degrees) in the third air flow channel 13 is also an important factor, in addition to the aforementioned swirl angles, for the same reason.

The swirl angle of powdered-solid-fuel flows caused by the swirl vane 2a in the aforementioned powdered-solid-fuel flow channel 2 is preferably set to be 0 degree to 15 degrees. If this swirl angle is larger than 15 degrees, this induces excessive mixture of the powdered solid fuel (pulverized coal C) ejected from the powdered-solid-fuel flow channel 2, with the aforementioned secondary air introduced in the powdered-solid-fuel flow channel 2, the outer air flow-channel group 5 and flame. This may raise the temperature of burner flame formed by the powdered solid fuel and, further, may cause difficulty in controlling the shape of burner flame, which may degrade the quality of the produced cement clinker.

The swirl angle of first swirl inner flows (air flows from the first air flow channel 11) caused by the swirl vane 11a is preferably set to be 30 degrees to 50 degrees. If this swirl angle is less than 30 degrees, this induces insufficient mixture of the powdered solid fuel ejected from the powdered-solid-fuel flow channel 2 with the first swirl inner flows. This may result in degradation of the quality of the produced cement clinker or insufficient reduction of the amount of NOx contained in the exhaust gas.

On the other hand, if the aforementioned swirl angle exceeds 50 degrees, this induces excessive mixture of the powdered solid fuel with the first swirl inner flows, which may cause difficulty in controlling the shape of flame, thereby degrading the quality of the produced cement clinker.

Further, in the cement kiln burner device (1b, 1c), the swirl angle of first swirl inner flows (air flows from the third air flow channel 13) caused by the swirl vane 13a is preferably set to be 1 degree to 50 degrees. If this swirl angle of first swirl inner flows is less than 1 degree, this induces insufficient mixture of the powdered solid fuel ejected from the powdered-solid-fuel flow channel 2 with the first swirl outer flows. This may result in degradation of the quality of the produced cement clinker or insufficient reduction of the amount of NOx contained in the exhaust gas. On the other hand, if the aforementioned swirl angle exceeds 50 degrees, this induces excessive mixture of the powdered solid fuel with the first swirl outer flows, which causes difficulty in controlling the shape of flame, thereby degrading the quality of the produced cement clinker.

It is preferable to lower the amounts of primary air (m3N/min) in the respective air flow channels (2, 4, 11, 13, 51, 52, 53), as much as possible, in view of stably forming reduction areas in flame. On the other hand, if the aforementioned amounts of primary air are excessively lowered, this may change the shape of flame, which shifts high-temperature areas to the inside of the cement kiln, thereby degrading the quality of the produced cement clinker. In the examples represented in Tables 1 and 2, air flows from the powdered-solid-fuel flow channel 2 and air flows from the outer air flow-channel group 5 are made larger, in flow rate (amount of primary air), than the other air flows. This is for smoothly introducing the secondary air at a higher temperature into flame for rapidly raising the temperatures of the pulverized coal C (the powdered solid fuel) and the combustible solid waste RF, in order to facilitate discharge of volatile components for stabilizing flame reduction states.

According to the aforementioned description, it is possible to optimize conditions of operation of the cement kiln burner device (1, 1a) in a shorter time, by setting the swirl angles of the respective swirl vanes (2a, 11a) in the powdered-solid-fuel flow channel 2 and the first air flow channel 11 (first swirl inner flows) within the ranges illustrated in FIG. 2 before operation of the cement kiln burner device (1, 1a) and, further, by setting the burner-tip flow velocities and the amounts of primary air of air flows ejected from the respective air flow channels (2, 4, 11) and from the respective second air flow channels (51, 52, 53) constituting the outer air flow-channel group 5 within the ranges illustrated in Table 2 through adjustments of the amounts of primary air flowing through the air pipes (22, 23, 30 to 33) by the blowing fans (F1 to F6), during running.

Similarly, in the cases of the cement kiln burner devices (1b, 1c), it is possible to optimize conditions of operation of the cement kiln burner device (1b, 1c) in a shorter time, by setting the swirl angles of the respective swirl vanes (2a. 11a, 13a) in the powdered-solid-fuel flow channel 2, the first air flow channel 11 (first swirl inner flows) and the third air flow channel 13 (first swirl outer flows) within the ranges illustrated in FIG. 1 before operation and, further, by setting the burner-tip flow velocities and the amounts of primary air of air flows ejected from the respective air flow channels (2, 4, 11) and from the respective second air flow channels (51, 52, 53) constituting the outer air flow-channel group 5 within the ranges illustrated in Table 2, through adjustments of the amounts of primary air flowing through the air pipes (22, 23, 30 to 34) by the blowing fans (F1 to F7), during operation.

Next, there will be described combustion simulations regarding the rate of landing combustion (the kiln inside falling rate) of combustible solid waste RF (in this case, non-rigid plastic), in cases of varying the burner-tip flow velocity (m/s) of air flows ejected from each of the three second air flow channels (51, 52, 53) constituting the outer air flow-channel group 5 positioned in the outermost side.

More specifically, investigations were conducted through simulations (software: FLUENT manufactured by ANSYS JAPAN K.K.), by fixing burner combustion conditions as will be described later. Namely, investigations were conducted for determining whether non-rigid plastic sheets with a diameter of 20 mm or 30 mm were burned out within burner flame or in landing combustion, in cases of varying the burner-tip flow velocities of air flows ejected from the respective three second air flow channels (51, 52, 53) constituting the outer air flow-channel group 5 positioned in the outermost side, on a basis of second-air-flow-channel by second-air-flow-channel basis.

Further, the simulations were conducted for the cement kiln burner device 1 illustrated in FIG. 1, under a condition where a constant total amount of primary air was supplied to the three second air flow channels (51, 52, 53) constituting the outer air flow-channel group 5 through the air pipes (31, 32, 33) by the blowing fans (F4, F5, F6).

<Burner Combustion Conditions>

The total amount of heat generation from pulverized coal C and combustible solid waste RF: 420 GJ/hour The size and the shape of waste plastic (non-rigid plastic) as combustible solid waste RF: a circular sheet shape with a diameter of 20 mm or 30 mm which was formed by punching a sheet with a thickness of 0.5 mm The burner-tip flow velocity and the primary air ratio of combustible-solid-waste flows ejected from the combustible-solid-waste flow channel 4: 50 m/s, 2 vol %

The rate of contribution of heat generation from waste plastic as combustible solid waste RF, in the aforementioned total amount of heat generation (which will be referred to as "fuel substitution rate", hereinafter): 30 amount-of-heat % or 60 amount-of-heat %

The burner-tip flow velocity, the primary air ratio and the swirl angle of powdered-solid-fuel flows ejected from the powdered-solid-fuel flow channel 2: 50 m/s, 5 vol %, 5 degrees The burner-tip flow velocity, the primary air ratio and the swirl angle of first swirl inner flows ejected from the first air flow channel 11: 150 m/s, 2 vol %, 40 degrees The primary air ratio and the swirl angle of first straight outer flow group ejected from the outer air flow-channel group 5: 6 vol %, 0 degree The burner-tip flow velocity of air flows ejected from the second air flow channels (51, 52, 53) constituting the outer air flow-channel group 5: as represented in Table 3

The amount and the temperature of secondary air: 150000 Nm3/hour, 800 degrees C.

The diameter of the burner tip in the cement kiln burner device 1: 700 mm

Figure 12:
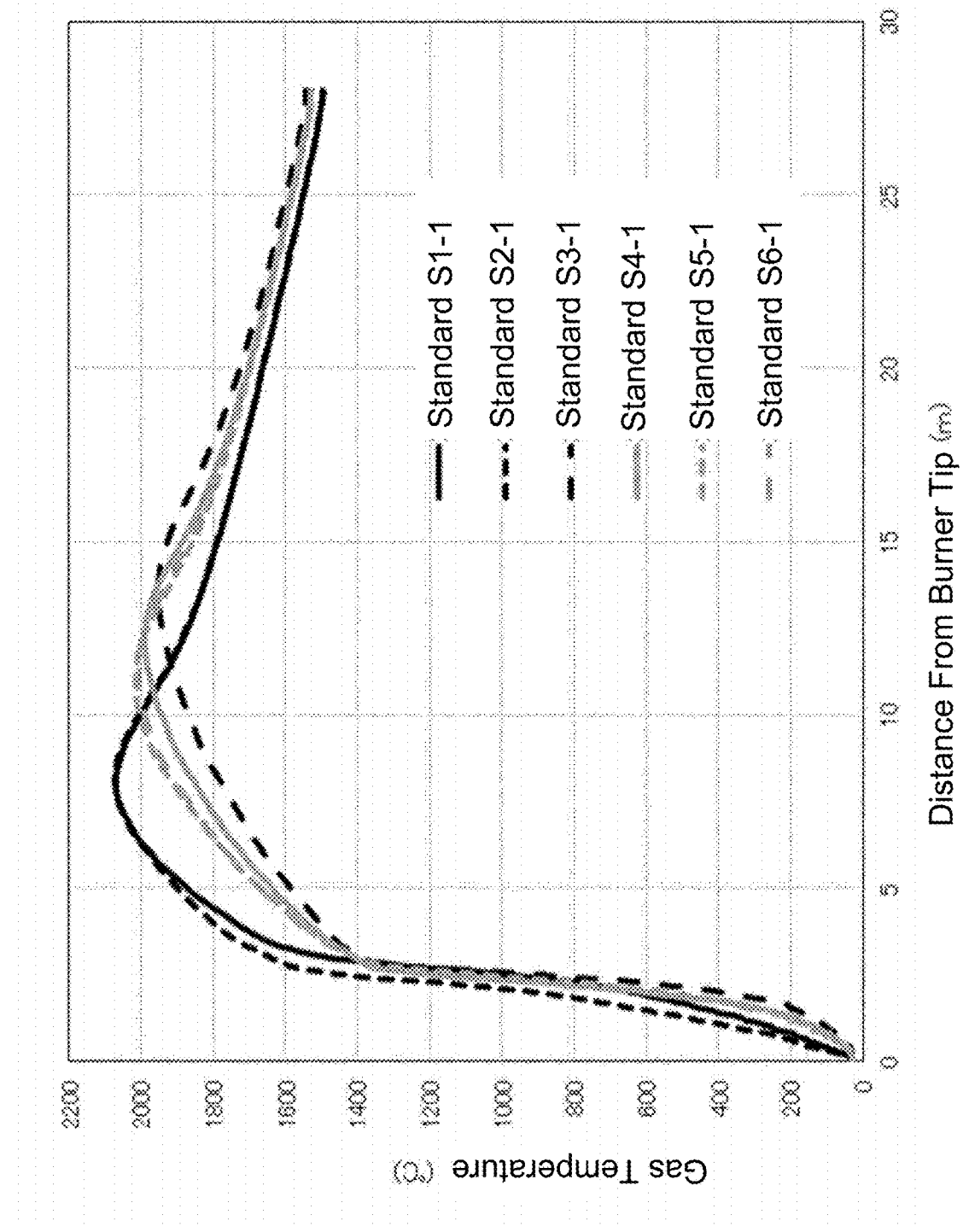
FIG. 12 is a graph illustrating results of simulations regarding gas temperature distributions within the cement kiln, in cases of combustions using waste plastics with a diameter of 20 mm with a fuel substitution rate of 30 amount-of-heat %, with the cement kiln burner device illustrated in FIG. 1.

The following Table 3 illustrates the results of the simulations. Further, FIG. 12 illustrates gas temperature distribution states within the cement kiln, under respective standards, when a waste plastic with a diameter of 20 mm was used with a fuel substitution rate of 30 amount-of-heat %.

More specifically, in the cement kiln burner device 1 illustrated in FIG. 1, under the respective standards having different combinations of burner-tip flow velocities of air flows ejected from the respective second air flow channels (51, 52, 53) constituting the outer air flow-channel group 5, the simulations were conducted regarding three standards having different sizes of waste plastic (non-rigid plastic) as combustible solid waste RF, and different fuel substitution rates. Further, standards S5 represent aspects of air flows ejected from the outer air flow-channel group 5, which are equivalent to settings of air flows in cement kiln burner devices which have been currently used for general purposes. The standards S5 are standards positioned as evaluation criterions (blanks).

TABLE 3

| | Burner-tip flow velocity (m/s) | | | Non-rigid plastic | | |
| --- | --- | --- | --- | --- | --- | --- |
| | | | | | Fuel | Kiln |
| Standard | Second air flow channel 51 | Second air flow channel 52 | Second air flow channel 53 | Diameter (mm) | substitution rate (amount-of-heat %) | inside falling rate (mass %) | Remark |
| S1-1 | 300 | 0 | 0 | 20 | 30 | 0 | |
| S1-2 | | | | | 60 | 1 | |
| S1-3 | | | | 30 | 30 | 3 | |
| S2-1 | 0 | 0 | 300 | 20 | 30 | 0 | |
| S2-2 | | | | | 60 | 0 | |
| S2-3 | | | | 30 | 30 | 0 | |
| S3-1 | 100 | 100 | 100 | 20 | 30 | 51 | |
| S3-2 | | | | | 60 | 75 | |
| S3-3 | | | | 30 | 30 | 92 | |
| S4-1 | 150 | 0 | 150 | 20 | 30 | 29 | |
| S4-2 | | | | | 60 | 50 | |
| S4-3 | | | | 30 | 30 | 63 | |
| S5-1 | 150 | 150 | 0 | 20 | 30 | 15 | Air flows equivalent to current burner |
| S5-2 | | | | | 60 | 29 | running conditions (corresponding to |
| S5-3 | | | | 30 | 30 | 40 | blank) |
| S6-1 | 0 | 150 | 150 | 20 | 30 | 13 | |
| S6-2 | | | | | 60 | 23 | |
| S6-3 | | | | 30 | 30 | 33 | |

The results in Table 3 reveals that, in the case of the cement kiln burner device 1 illustrated in FIG. 1, under standards (S1, S2) where air flows ejected from the outer air flow-channel group 5 were ejected from only any one of the three second air flow channels (51, 52, 53), the kiln inside falling rate of the combustible solid waste RF could be sufficiently lowered, in comparison with under standards (S3, S4, S5, S6) where air flows ejected from the outer air flow-channel group 5 were ejected from two or more of the three second air flow channels (51, 52, 53). Particularly, it is revealed that, under the standards S2, even when the fuel substitution rate was 50 amount-of-heat %, and even when the non-rigid plastic had a diameter of 30 mm, the combustible solid waste RF could be combusted without being landing-combusted. This reveals that, with the cement kiln burner device and the method for operating the cement kiln burner device according to the present invention, it is possible to effectively burn out combustible solid wastes RF with particle sizes of up to 30 mm in burner flame, without causing landing combustion thereof.

Further, under the standards (S1, S2) where air flows ejected from the outer air flow-channel group 5 were ejected from only any one of the three second air flow channels (51, 52, 53), and under the standards (S3, S4, S5, S6) where air flows ejected from the outer air flow-channel group 5 were ejected from two or more of the three second air flow channels (51, 52, 53), there were larger differences therebetween in the kiln inside falling rate of the combustible solid waste RF, regardless of the same amount (=the same flow velocity) of primary air from the outer air flow-channel group 5.

Regarding the gas temperature distributions within the cement kiln in the cases of using the waste plastic with a diameter of 20 mm with a fuel substitution rate of 20 amount-of-heat % (standards S1-1, S2-1, S3-1, S4-1, S5-1, S6-1), which are illustrated in FIG. 12, similarly, there were exhibited large differences between the results from the standards (S1, S2) and the standards (S3, S4, S5, S6). Namely, it can be seen that, under the standards (S1, S2), the gas temperature was made highest at a position near the cement kiln burner device 1, so that there was so-called short flame. On the contrary, it can be seen that, under the standards (S3, S4, S5, S6), the gas temperature was made highest at a position farther from the cement kiln burner device 1 and, also, there was a more moderate temperature distribution curve, so that there was so-called long flame. Namely, it can be seen that, with the cement kiln burner device 1 according to the present invention, it is possible to easily make burner flame be long flame suitable for combustion of pulverized coal C or be short flame suitable for combustion of combustible solid waste RF. Further, from the results of the investigations, it is possible to conclude that the same functions can be realized with the other cement kiln burner devices (1a, 1b, 1c).

Namely, it can be seen that, with the present invention, it is possible to easily perform adjustments for providing optimum flame, according to the cement-kiln operating environments such as the burner combustion state, and the types of fuels.

DESCRIPTION OF REFERENCE SIGNS 1, 1a, 1b, 1c Cement kiln burner device
2 Powdered-solid-fuel flow channel
2a Swirl vane
3 Oil flow channel
4 Combustible-solid-waste flow channel
5 Outer air flow-channel group
9 Axis
10 Center line of swirl vane
11 First air flow channel
11a Swirl vane
13 Third air flow channel
13a Swirl vane
20, 20a, 20b, 20c Cement kiln burner system
22 Pulverized-coal transfer pipe
23 Combustible-solid-waste transfer pipe
30, 31, 32, 33, 34 Air pipe
51, 52, 53 Second air flow channel
51b, 52b Partition portion
51c, 52c, 53c Partition portion for partitioning second air flow channel in circumferential direction
51-1, 51-2, 51-3, 51-4 Opening portion which is division of second air flow channel 51
52-1, 52-2, 52-3, 52-4 Opening portion which is division of second air flow channel 52
53-1, 53-2, 53-3, 53-4 Opening portion which is division of second air flow channel 53
311, 312, 313, 314, 321, 322, 323, 324, 331, 332, 333, 334 Branch pipe
A Combustion air
B11, B12, B13, B14, B21, B22, B23, B24, B31, B32, B33, B34
Variable gas valve
C Pulverized coal
F1, F2, F3. F4, F5, F6, F7 Blowing fan
RF Combustible solid waste
ta2 Radial width of powdered-solid-fuel flow channel
ta5(ta51, ta52, ta53) Radial width of second air flow channel constituting outer air flow-channel group
tb5(tb51, tb52) Radial interval between respective second air flow channels
constituting outer air flow-channel group
ta11 Radial width of first air flow channel

What is claimed is:

1. A cement kiln burner device including a plurality of flow channels partitioned by a plurality of concentric cylindrical members, the cement kiln burner device comprising:
   a powdered-solid-fuel flow channel including means for swirling a powdered solid fuel flow;
   a first air flow channel placed inside the powdered-solid-fuel flow channel to be adjacent to the powdered-solid-fuel flow channel, the first air flow channel including means for swirling an air flow;
   an outer air flow-channel group placed concentrically in an outermost side outside the powdered-solid-fuel flow channel, the outer air flow-channel group including three or more second air flow channels adapted to form means for straightly forwarding an air flow; and
   a combustible-solid-waste flow channel placed inside the first air flow channel, wherein
   the three or more second air flow channels constituting the outer air flow-channel group are placed proximally to each other in a radial direction within a range where air flows ejected from the respective second air flow channels are merged to form a single air flow, and are configured to control flow rates of the air flows ejected from the respective second air flow channels, independently for each second air flow channel,
   wherein at least one second air flow channel, out of the second air flow channels constituting the outer air flow-channel group, is divided in a circumferential direction into four or more opening portions adapted to form ports for injecting air flows, and is configured to control flow rates of the air flows ejected from the respective opening portions, independently for each opening portion.

2. The cement kiln burner device according to claim 1, wherein
   two or more second air flow channels, out of the second air flow channels constituting the outer air flow-channel group, are configured to control the flow rates of the air flows ejected from the respective opening portions, which are four or more divisions in the circumferential direction, independently for each opening portion, and
   the respective opening portions included in the respective second air flow channels are placed in concentric circular arc shapes at common deflection angles on polar coordinates with an origin point at an axis center, when being taken along a plane orthogonal to the axis center.

3. The cement kiln burner device according to claim 1, further comprising a third air flow channel placed outside the powdered-solid-fuel flow channel and inside the outer air flow-channel group, the third air flow channel including means for swirling an air flow.

4. The cement kiln burner device according to claim 2, further comprising a third air flow channel placed outside the powdered-solid-fuel flow channel and inside the outer air flow-channel group, the third air flow channel including means for swirling an air flow.

5. A method for operating the cement kiln burner device including a plurality of flow channels partitioned by a plurality of concentric cylindrical members, wherein the cement kiln burner device comprises:
- a powdered-solid-fuel flow channel including means for swirling a powdered solid fuel flow;
- a first air flow channel placed inside the powdered-solid-fuel flow channel to be adjacent to the powdered-solid-fuel flow channel, the first air flow channel including means for swirling an air flow;
- an outer air flow-channel group placed concentrically in an outermost side outside the powdered-solid-fuel flow channel, the outer air flow-channel group including three or more second air flow channels adapted to form means for straightly forwarding an air flow; and
- a combustible-solid-waste flow channel placed inside the first air flow channel, wherein the three or more second air flow channels constituting the outer air flow-channel group are placed proximally to each other in a radial direction within a range where air flows ejected from the respective second air flow channels are merged to form a single air flow, and are configured to control flow rates of the air flows ejected from the respective second air flow channels, independently for each second air flow channel, said method comprising ejecting an air flow from at least one second air flow channel, out of the second air flow channels constituting the outer air flow-channel group, wherein air flows ejected from all the second air flow channels have a flow velocity of 400 m/s or less at a burner tip
- the air flow containing the powdered solid fuel which is ejected from the powdered-solid-fuel flow channel has a flow velocity of 30 m/s to 80 m/s at the burner tip,
- the air flow ejected from the first air flow channel has a flow velocity of 5 m/s to 240 m/s at the burner tip, and
- an air flow containing a combustible solid waste which is ejected from the combustible-solid-waste flow channel has a flow velocity of 30 m/s to 80 m/s at the burner tip.

6. A method for operating the cement kiln burner device including a plurality of flow channels partitioned by a plurality of concentric cylindrical members, wherein the cement kiln burner device comprises:
- a powdered-solid-fuel flow channel including means for swirling a powdered solid fuel flow;
- a first air flow channel placed inside the powdered-solid-fuel flow channel to be adjacent to the powdered-solid-fuel flow channel, the first air flow channel including means for swirling an air flow;
- an outer air flow-channel group placed concentrically in an outermost side outside the powdered-solid-fuel flow channel, the outer air flow-channel group including three or more second air flow channels adapted to form means for straightly forwarding an air flow; and
- a combustible-solid-waste flow channel placed inside the first air flow channel, wherein the three or more second air flow channels constituting the outer air flow-channel group are placed proximally to each other in a radial direction within a range where air flows ejected from the respective second air flow channels are merged to form a single air flow, and are configured to control flow rates of the air flows ejected from the respective second air flow channels, independently for each second air flow channel, said method comprising ejecting an air flow from at least one second air flow channel, out of the second air flow channels constituting the outer air flow-channel group, wherein
- air flows ejected from all the second air flow channels have a flow velocity of 400 m/s or less at a burner tip,
- the cement kiln burner device further includes a third air flow channel placed outside the powdered-solid-fuel flow channel and inside the outer air flow-channel group, the third air flow channel including means for swirling an air flow, and
- an air flow ejected from the third air flow channel has a swirl angle of 1 degree to 50 degrees at the burner tip, and further has a flow velocity of 60 m/s to 240 m/s at the burner tip.

7. A method for operating the cement kiln burner device including a plurality of flow channels partitioned by a plurality of concentric cylindrical members, wherein the cement kiln burner device comprises:
- a powdered-solid-fuel flow channel including means for swirling a powdered solid fuel flow;
- a first air flow channel placed inside the powdered-solid-fuel flow channel to be adjacent to the powdered-solid-fuel flow channel, the first air flow channel including means for swirling an air flow;
- an outer air flow-channel group placed concentrically in an outermost side outside the powdered-solid-fuel flow channel, the outer air flow-channel group including three or more second air flow channels adapted to form means for straightly forwarding an air flow; and
- a combustible-solid-waste flow channel placed inside the first air flow channel, wherein the three or more second air flow channels constituting the outer air flow-channel group are placed proximally to each other in a radial direction within a range where air flows ejected from the respective second air flow channels are merged to form a single air flow, and are configured to control flow rates of the air flows ejected from the respective second air flow channels, independently for each second air flow channel, said method comprising ejecting an air flow from at least one second air flow channel, out of the second air flow channels constituting the outer air flow-channel group, wherein
- air flows ejected from all the second air flow channels have a flow velocity of 400 m/s or less at a burner tip, and
- a combustible solid waste ejected from the combustible-solid-waste flow channel has a particle size of 30 mm or less.

8. A method for operating the cement kiln burner device according to claim 1, comprising ejecting an air flow from at least one second air flow channel, out of the second air flow channels constituting the outer air flow-channel group, wherein
air flows ejected from all the second air flow channels have a flow velocity of 400 m/s or less at a burner tip.

9. A method for operating the cement kiln burner device according to claim 2, comprising ejecting an air flow from at least one second air flow channel, out of the second air flow channels constituting the outer air flow-channel group, wherein
air flows ejected from all the second air flow channels have a flow velocity of 400 m/s or less at a burner tip.

10. The method for operating the cement kiln burner device according to claim 8, comprising operating the cement kiln burner device while changing a flow rate of an air flow ejected from at least one second air flow channel, out of the second air flow channels constituting the outer air flow-channel group.

11. The method for operating the cement kiln burner device according to claim 9, comprising operating the cement kiln burner device while changing a flow rate of an air flow ejected from at least one second air flow channel, out of the second air flow channels constituting the outer air flow-channel group.

* * * * *

UNITED STATES PATENT AND TRADEMARK OFFICE
CERTIFICATE OF CORRECTION

PATENT NO. : 11,428,402 B2  
APPLICATION NO. : 16/643172  
DATED : August 30, 2022  
INVENTOR(S) : Yuya Sano It is certified that error appears in the above-identified patent and that said Letters Patent is hereby corrected as shown below:

In the Specification

Column 8, Line 11, delete "FIG.1." and insert -- FIG.1, --.

Column 12, Line 11, delete "524)," and insert -- 52-4), --.

Column 12, Line 30, delete "534." and insert -- 53-4. --.

Column 16, Line 20, delete "Incidentally." and insert -- Incidentally, --.

Column 22, Line 36, delete "(2a." and insert -- (2a, --.

Column 26, Line 10, delete "F3." and insert -- F3, --.

Column 26, Line 18, delete "channel" and insert -- channel. --.

Signed and Sealed this  
Twenty-seventh Day of December, 2022

Katherine Kelly Vidal  
*Director of the United States Patent and Trademark Office*